(12) United States Patent
Freitag et al.

(10) Patent No.: US 10,069,896 B2
(45) Date of Patent: Sep. 4, 2018

(54) DATA TRANSFER VIA A DATA STORAGE DRIVE

(71) Applicant: International Business Machines Corporation, Armonk, NY (US)

(72) Inventors: Bernd Freitag, Partenheim (DE); Brian G. Goodman, Tucson, AZ (US); Frank Krick, Ockenheim (DE); Tim Oswald, Gimbsheim (DE)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 14/929,384

(22) Filed: Nov. 1, 2015

(65) Prior Publication Data

US 2017/0126780 A1    May 4, 2017

(51) Int. Cl.
| G06F 3/00 | (2006.01) |
|---|---|
| H04L 29/08 | (2006.01) |
| G06F 3/06 | (2006.01) |
| G06F 17/30 | (2006.01) |
| H04L 29/06 | (2006.01) |

(52) U.S. Cl.
CPC ............ *H04L 67/06* (2013.01); *G06F 3/0604* (2013.01); *G06F 3/067* (2013.01); *G06F 3/0638* (2013.01); *G06F 3/0647* (2013.01); *G06F 3/0686* (2013.01); *G06F 17/30203* (2013.01); *H04L 67/1097* (2013.01); *H04L 69/04* (2013.01)

(58) Field of Classification Search
None
See application file for complete search history.

(56) References Cited

U.S. PATENT DOCUMENTS

| 4,521,850 A | 6/1985 | Wilhite et al. |
|---|---|---|
| 5,740,061 A | 4/1998 | Dewey et al. |
| 6,401,127 B1 | 6/2002 | Lei et al. |
| 6,523,102 B1 | 2/2003 | Dye et al. |
| 7,752,384 B2 | 7/2010 | Moody, II et al. |
| 8,223,600 B2 | 7/2012 | Barbian et al. |

(Continued)

FOREIGN PATENT DOCUMENTS

| WO | 2010111312 A2 | 9/2010 |
|---|---|---|
| WO | 2011093796 A1 | 8/2011 |

OTHER PUBLICATIONS

IBM: List of IBM Patents or Patent Applications Treated As Related (Appendix P).

(Continued)

*Primary Examiner* — David Yi
*Assistant Examiner* — Craig S Goldschmidt
(74) *Attorney, Agent, or Firm* — Kristofer L. Haggerty

(57) ABSTRACT

Transferring data from a first data storage drive of a first data storage library to a first computer system that is connected to a second data storage drive of a second data storage library. A data transfer request for transferring data accessible by the first data storage drive to the first computer system is received. A network connection is initiated between the first and the second data storage drive. An access to the requested data is initiated by the first data storage drive. A transfer of the requested data from the first to the second data storage drive via the network connection is initiated. A transfer of the requested data from the second data storage drive to the first computer system is initiated.

7 Claims, 9 Drawing Sheets

(56) References Cited

U.S. PATENT DOCUMENTS

| | | |
|---|---|---|
| 8,427,774 B2 | 4/2013 | Green et al. |
| 8,527,561 B1 | 9/2013 | Moody, II et al. |
| 8,566,517 B1 | 10/2013 | Sims et al. |
| 8,675,296 B2 | 3/2014 | Amir et al. |
| 8,868,866 B2 | 10/2014 | Hoelsaeter |
| 8,886,606 B2 | 11/2014 | Wideman |
| 2003/0028841 A1 | 2/2003 | Rushton et al. |
| 2006/0212481 A1* | 9/2006 | Stacey .............. G06F 17/30067 |
| 2007/0006020 A1 | 1/2007 | Fujita |
| 2007/0283120 A1 | 12/2007 | Fujita et al. |
| 2007/0299959 A1 | 12/2007 | Penny et al. |
| 2008/0282031 A1 | 11/2008 | Tanoue |
| 2009/0177838 A1 | 7/2009 | Haustein et al. |
| 2009/0213490 A1 | 8/2009 | Green et al. |
| 2012/0131280 A1* | 5/2012 | Iwasaki ................... G06F 3/065 |
| | | 711/133 |
| 2013/0271865 A1 | 10/2013 | Amir et al. |
| 2014/0379980 A1 | 12/2014 | Hasegawa et al. |
| 2015/0055241 A1 | 2/2015 | Abe et al. |
| 2017/0123672 A1 | 5/2017 | Freitag et al. |
| 2018/0081553 A1 | 3/2018 | Freitag et al. |

OTHER PUBLICATIONS

Pending U.S. Appl. No. 14/929,385, filed Nov. 1, 2015, Entitled: "Data Transfer Between Data Storage Libraries", 52 Pages.

International Search and Examination Report, dated Mar. 22, 2017, Application No. GB1616436.0, 8 pages.

Pease et al., "The Linear Tape File System", 2010 IEEE, 8 pages.

Prakash, "Back to the Future: Using Magnetic Tapes in Cloud Based Storage Infrastructures", Middleware 2013, LNCS 8275, pp. 287-306.

Sun Microsystems, "StorageTek Streamline SL8500", Modular Library System, User's Guide Part No. 96154, Revision K, Mar. 2007, 200 pages.

IBM, List of IBM Patents or Patent Applications Treated as Related, Appendix P, dated Dec. 28, 2017, 2 pages.

Pending U.S. Appl. No. 15/825,200, filed Nov. 29, 2017, entitled: "Data Transfer Between Data Storage Libraries", 50 pages.

\* cited by examiner

DATA TRANSFER VIA A DATA STORAGE DRIVE

BACKGROUND

The present invention relates generally to the field of transferring data from a peripheral to a computer, and more particularly to transferring data via a data storage drive of a data storage library to a computer system.

With the ever-growing storage capacities of modern data storage systems, data analysis applications are required to analyze large data repositories provided by these systems. In order to further enlarge the storage capacity, modern data storage systems rely on distributed infrastructures such as cloud infrastructures. These systems include large numbers of storage units such as storage libraries, each library including large numbers of storage media. For example, the storage capacity provided by magnetic tape libraries may range from terabytes up to exabytes of data. A respective magnetic tape library may include thousands of magnetic tapes packaged in cartridges. In order to be able to perform data analysis tasks for these distributed systems, data analysis applications may require access for a short period of time to data stored on storage locations distributed over multiple libraries.

For this type of data analysis, there is a need for high-performance access to data stored on magnetic tapes in multiple magnetic tape libraries. In addition, host applications that commonly use magnetic tape libraries expect to be able to move any magnetic tape cartridge to any magnetic tape drive in the library. As libraries increase in size, to handle the very large data demands of cloud computing, among other things, they may become difficult to manage. For example, the space available in a data center for installing a new library or expanding an existing library may be limited due to other equipment installed nearby, or the presence of walls, columns, air conditioning systems, etc. This has created the need for installing multiple independent library systems and mechanically connecting them such that cartridges can pass from one library to another, thereby creating a very large library from multiple smaller libraries.

For transferring data between magnetic tape libraries, mechanical pass-through connections are known from the prior art. These mechanical pass-through connections are provided, for example, by automated electromechanical transportation tunnel systems extending between the magnetic tape libraries, and mechanically transporting magnetic tape cartridges from one magnetic tape library to another.

However, known mechanical transport systems may have the following disadvantages: mechanical wear of individual components of the transport system; mechanical defects with the risk of a blocking of the transportation tunnel due to cartridges stuck therein; high workload and costs due to the requirement of manually building up the mechanical systems and performing alignment maintenance work; the requirement of providing magnetic tape libraries at the same location, e.g., next to each other within a data center, in order to be able to provide reliable mechanical transport connections; the requirement to use the same and/or compatible magnetic tape library type and magnetic tape technology, e.g., LTO (linear tape-open), in order to ensure usability of exported magnetic tape cartridges by the target libraries; limited flexibility and scalability of the mechanical infrastructure; loss of exported magnetic tape cartridges by the source, i.e., these losses need to be compensated by importing new magnetic tape cartridges in order to maintain the storage capacity of the source library; and limited storage capacity for storing imported magnetic tape cartridges by the target library.

SUMMARY

Embodiments of the present invention disclose a computer-implemented method, computer program product, and system for transferring data via a data storage drive of a data storage library to a computer system.

In one aspect, a method for transferring data from a first magnetic tape drive of a first magnetic tape library to a first computer system is provided. The first computer system is connected to a second magnetic tape drive of a second magnetic tape library. Data transfer between the first and second magnetic tape drives is controlled by a data transfer management component. The data transfer management component receives a data transfer request for transferring data accessible by the first magnetic tape drive to the first computer system. A network connection between the first and the second magnetic tape drive is initiated. An access to the requested data is initiated by the first magnetic tape drive. A transfer of the requested data from the first to the second magnetic tape drive via the network connection is initiated. A transfer of the requested data from the second magnetic tape drive to the first computer system is initiated.

A data storage cartridge may, for example, encompass a magnetic tape cartridge including a magnetic tape. A data storage drive may, for example, encompass a magnetic tape drive. A data storage library may, for example, encompass a magnetic tape library.

A magnetic tape library is a storage system which may include one or more tape drives performing reading and writing of data from and onto magnetic tapes, a plurality of slots to hold tape cartridges including magnetic tapes, one or more automated robotic mechanisms for loading tapes from storage slots into the magnetic tape drives. A tape library may further comprise a barcode reader to identify tape cartridges and thereby the data stored thereon. Such a magnetic tape library may have the capability of optically scanning barcode labels which are attached to each magnetic tape cartridge, allowing automatically maintaining an inventory of the locations of the magnetic tape cartridges within the library. The tape drives may comprise compression modules, e.g., compression chips, in form of embedded software and/or hardware components providing lossless data compression and decompression of data written on and read from the magnetic tapes. Algorithms used for the data compression may be, for example, LZ, IDRC, ALDC, or DLZ1.

Magnetic tape libraries may provide a finite storage capacity for magnetic tape cartridges due to spatial restrictions. In order to exceed this finite capacity, a plurality of tape libraries may be interconnected, e.g., in the form of a long library string, where the library frames are added side by side and an accessor may travel between the library frames to move magnetic tape cartridges from storage slots to the tape drives. The storage capacity may further be increase by connecting those library strings with mechanical pass-through mechanisms, e.g., an automated electromechanical transportation tunnel systems extending between the magnetic tape libraries A magnetic tape may be comprised by a cartridge, sometimes also referred to as a cassette. The cartridge may comprise one or more reels. For simplicity a magnetic tape cartridge may herein also be referred to as magnetic tape.

A magnetic tape library infrastructure including a plurality of magnetic tape libraries may, e.g., be used to provide a cloud storage infrastructure. Cloud computing may refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Such a cloud storage infrastructure may, e.g., be used for backup tasks. Cloud computing may, e.g., provide for the following:

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storages, deployed applications, and possibly limited control of select networking components (e.g., host firewalls).

A magnetic tape library infrastructure including a plurality of magnetic tape libraries may, e.g., comprise individual direct and/or indirect network connections and may not be part of a storage cloud infrastructure.

A network may be any kind of wireless or wired information network, such as Ethernet or a storage area network (SAN) using, e.g., Fibre Channel (FC). A network connection may be a point-to-point data communication channel over a data network between two network devices such as computer devices or magnetic tape drives. Fibre Channel is a high-speed network technology, commonly running at 2-, 4-, 8- and 16-gigabit per second rates, which is standardized in the T11 Technical Committee of the International Committee for Information Technology Standards (INCITS). Fibre Channel may be provided in three major topologies depending on the number of ports that are connected. A port may refer to any entity that actively communicates over the network. The point-to-point (FC-P2P) topology comprises two devices connected directly to each other. In the arbitrated loop (FC-AL) topology all devices are placed in a loop or ring such that adding or removing a device from the loop causes all activity on the loop to be interrupted. In case of the switched fabric (FC-SW) topology, all devices or loops of devices are connected to Fibre Channel switches.

The present invention may provide for a method to efficiently pass through data, even single data objects or files, from a magnetic tape of one magnetic tape library to a computer system providing, for example, a data processing system connected to a second magnetic tape library. According to various embodiments, file based content of a first magnetic tape may be transferred from a first magnetic tape library to a second magnetic tape library. Thus, it may allow copying data, objects, and/or files of magnetic tapes from one magnetic tape drive to another magnetic tape drive. Embodiments may ensure that the data transfer is performed at maximum transfer speed. It may further be ensured that the resources used are minimized.

The requested data is provided to the first computer system by the second magnetic tape drive which may be directly connected to the first magnetic tape drive without any host computer system of the first or second magnetic tape library being placed in the data transfer path between the first magnetic tape drive and the first computer system via the second magnetic tape drive.

Advantages of the present invention may be the following:

Embodiments may provide multipurpose tape drives which may be configured dynamically for inter library data transfer operations or normal magnetic tape read/write operations. This may increase the overall tape library data throughput in both nodes provided by the respective magnetic tape drives.

Data exchange between different concurrent running applications and tape library systems worldwide may be provided.

Short data delivery times may be implemented, e.g., due to the fact that only a single cartridge including the first magnetic tape may be moved within the first magnetic tape library.

A dynamical configuration of data transfer channels in form of network connections between magnetic tape drives may allow for a flexible system configuration.

Load balancing over different magnetic tape libraries and associated servers may be supported.

A consistent data inventory of the magnetic tape libraries may be maintained.

Selections of individual data objects of a first magnetic tape may be transferred.

Embodiments may further have the beneficial effect of providing an automatic transfer of single objects from or to magnetic tape cartridges, for example, between magnetic tape libraries of multiple different vendors, between different magnetic tape technologies and generations, between different locations of different data centers around the globe, between different applications and data processing steps such as data analytics servers.

Furthermore, these features may have the beneficial effect that data which is not comprised by the second library, the magnetic tapes of which are accessible to the second magnetic tape drive, may efficiently be provided to the first computer system via the second magnetic tape drive requesting the respective data from the first magnetic tape drive of the first magnetic tape library.

From the prior art solutions are known for providing magnetic tapes from one magnetic tape library to another magnetic tape library, in case data is requested at a magnetic tape drive of the second library which is comprised by the magnetic tapes stored in the second magnetic tape library. However, these solutions are based on a mechanical transport of the cartridge containing the magnetic tape including the requested data. Thus, the complete data content of the respective magnetic tape is transported from one magnetic tape library to the other one. Compared with this prior art, embodiments of the present invention may have the beneficial effect to allow systematically selecting and transferring only the requested portion of the entire data content provided, e.g., by a magnetic tape stored in the first magnetic tape library.

Furthermore, embodiments may have the beneficial effect that they provide data transfer from one magnetic tape library to another one, even in case the respective libraries are located distant from each other, for example, in different rooms, on different floors, in different buildings or even on different continents, such that no mechanical pass-through mechanism may be provided between the two libraries. In some cases, the libraries may even be moved relative to each other, e.g., in case one of the libraries is aboard a scientific expedition ship.

According to various embodiments, the initiating of the access to the requested data by the first magnetic tape drive further comprises: initiating a mounting of a first magnetic tape including the requested data into the first magnetic tape drive.

This may have the beneficial effect that by mounting magnetic tapes of the first magnetic tape drive all the data stored in the first magnetic tape library is accessible to the first magnetic tape drive and may thus be provided to the first computer system via the second magnetic tape drive.

According to various embodiments, the requested data is provided on the first magnetic tape in a compressed data format. The method further comprises:
controlling the first magnetic tape drive to maintain the compressed data format by the first magnetic tape drive, when transferring the data,
initiating a decompressing of the compressed data received via the network connection by the second magnetic tape drive before transferring the data to the first computer system.

In order to save storage space, data stored on magnetic tapes in magnetic tape libraries may be compressed. When the respective data is read from the magnetic tape, it is decompressed by the magnetic tape drive reading the magnetic tape using a compression module embedded in the magnetic tape drive. Thus, the data read is provided in an uncompressed format to the computer system receiving the data. A compression module as used herein may refer to a software and/or a hardware component configured for compressing and/or decompressing of data. When writing data onto a magnetic tape, the data is provided in an uncompressed format to the magnetic tape drive and compressed by the compression module before being stored. The present feature may have the beneficial effect that the data read from the first magnetic tape by the first magnetic tape drive to be transferred to the second magnetic tape drive is not decompressed. The compressed format of the data is rather maintained by bypassing the compression module of the first magnetic tape drive. Thus, the data volume transferred from the first magnetic tape drive to the second magnetic tape drive due to the compression may be significantly smaller than the same data in the uncompressed format, e.g., by a factor of two or three. Compressed data received by the second magnetic tape drive may be decompressed by the second magnetic tape drive using its compression module before being transferred to the first computer system.

According to various embodiments, the initiating of the access to the requested data by the first magnetic tape drive further comprises:
selecting a subset of one or more data files of a set of data files comprised by the first magnetic tape to be transferred via the network connection,
initiating a reading of the selected subset of data files by the first data drive.

This may have the beneficial effect that the amount of data to be transferred between the first and second magnetic tape library may be significantly smaller compared to known solutions with a mechanical tape pass-through mechanism connecting magnetic tape libraries. Rather than transferring the full content of a magnetic tape, the individual requested data objects or files comprised by a magnetic tape may be selected.

According to various embodiments, the first magnetic tape library is one of a set of magnetic tape libraries, the method further comprises in response to receiving the data transfer request: selecting the first magnetic tape library from the set of magnetic tape libraries by initiating a querying of a file database including an inventory of the data files comprised by the magnetic tapes of the set of magnetic tape libraries for the requested data.

This may have the beneficial effect that an infrastructure is provided including a plurality of magnetic tape libraries. The requested data may be provided to the second magnetic tape drive in an efficient way by dynamically initiating the network connection to a source magnetic tape library, i.e., the first magnetic tape library, which actually contains the requested data. Dynamically initiating the connection, a theoretically unlimited number of magnetic tape libraries connectable with each other and still providing for each request a direct connection between the source library and the target library may be provided. The source library of the connection may be selected by selecting the magnetic tape library containing the first magnetic tape with the requested data.

According to various embodiments, the selecting further comprises: in case the magnetic tape library including the requested data comprises a dedicated magnetic tape drive connectable to the second magnetic tape drive via a network connection, selecting the dedicated magnetic tape drive to be the first magnetic tape drive and the magnetic tape drive including the dedicated magnetic tape drive to be the first magnetic tape library.

This may have the beneficial effect that the first magnetic tape drive to be connected may dynamically be selected based on the location of the data requested. In case the requested data is stored in a magnetic tape library including a dedicated magnetic tape drive connectable to the second magnetic tape drive via a network connection, the dedicated magnetic tape drive may be selected as the first magnetic tape drive. The magnetic tape with the requested data which is stored in the respective magnetic tape library may be mounted into the dedicated magnetic tape drive without a need for transferring the cartridge including the respective magnetic tape to another library.

According to various embodiments, the requested data is comprised by a second computer system connectable to the first magnetic tape drive, the initiating of the access to the requested data by the first magnetic tape drive further comprises: initiating a transfer of the requested data from the second computer system to the first magnetic tape drive.

The network connection between the first and second magnetic tape drive may thus be used for providing a data transfer connection between the first computer system connected to the second magnetic tape drive and a second computer system connected to the first magnetic tape drive. This may have the beneficial effect that not only data stored on magnetic tapes may be accessible via the network connection between first and second magnetic tape drive, but also data provided by a second computer system connected to the first magnetic tape drive. For example, data acquired by the second computer system may synchronously be provided to the first computer system in urgent cases for data analysis without previously storing the respective data on a magnetic tape of a magnetic tape library.

Thus, even in case of a data request requesting data which is not comprised by any magnetic tapes stored in libraries with magnetic tape drives connectable with the second magnetic tape drive, the network connection between the first and second magnetic tape drive may also be used for transferring data from a second computer system to a first computer system. According to various embodiments, the first magnetic tape drive may be selected using a query of a database providing an inventory of magnetic tape drive connectable to the second magnetic tape drive such that the second computer system including the requested data may be accessible via a drive-to-drive network connection, e.g., a point-to-point Fibre channel connection.

According to various embodiments, the method further comprises:

in response to the transfer of the requested data to the first magnetic tape drive initiating a compression of the requested data into a compressed data format by the first magnetic tape drive, initiating a decompressing of the compressed data received via the network connection by the second magnetic tape drive before transferring the data to the first computer system.

This may have the beneficial effect that the data transferred from the first to the second magnetic tape drive is transferred in a compressed format, significantly reducing the amount of data to be transferred and thus accelerating the transfer. According to various embodiments the data from the second computer system may be compressed by a compression module of the first magnetic tape drive before transfer to the second magnetic tape drive. The second magnetic tape drive may decompress the data received from the first magnetic tape drive before transferring the respective data to the first computer system using its compression module.

According to various embodiments, the first magnetic tape library is one of a set of magnetic tape libraries, the method further comprises in response to receiving the data transfer request:

selecting the first magnetic tape library from the set of magnetic tape libraries by initiating a querying of a second connection database including an inventory of magnetic tape drives of the set of magnetic tape libraries connectable to the second magnetic tape drive via a network connection and simultaneously connectable to the second computer system, in response to an identification of a magnetic tape drive connectable to the second magnetic tape drive via a network connection and simultaneously connectable to the second computer system, selecting the identified magnetic tape drive to be the first magnetic tape drive and the magnetic tape library of the identified magnetic tape drive to be the first magnetic tape library.

This may have the beneficial effect that for a second computer system including requested data a suitable magnetic tape drive for transferring the requested data from the second computer system to the first computer system via the second magnetic tape drive may be dynamically selected.

According to various embodiments, the first magnetic tape drive comprises at least two ports, the ports being operable in a first mode, pass-through mode, such that a first one of the ports is operated as a receiving port of the first magnetic tape drive and a second one of the ports is operated as a sending port of the first magnetic tape drive, in response to detecting the first magnetic tape drive being operated in the pass-through mode the initiating of the transfer of the requested data from the second computer system to the first magnetic tape drive further including:

initiating a connection between the receiving port of the first magnetic tape drive and the second computer system, and the initiating of the network connection between the first and the second magnetic tape drive further including:

the network connection being initiated between the sending port of the first magnetic tape drive and a receiving port of the second magnetic data drive.

This may have the beneficial effect that the first magnetic tape drive operated in the pass-through mode may allow for directly, i.e., without storing or buffering, transferring data received from the second computer system to the second magnetic tape drive via the network connection. The first magnetic tape drive operated in the pass-through mode may provide the functionality of a switch connecting the second computer system with the second magnetic tape drive. A switch refers a computer networking device that connects devices together on a computer network, e.g., by using packet switching to receive, process and forward data to the destination device. Depending on the ports, switch implemented by the first magnetic tape drive may, e.g., be an Ethernet- or Fibre-Channel-switch.

According to various embodiments, the ports of the first magnetic tape drive further are operable in a second mode such that both ports are operated as receiving or sending ports, the method further comprises:

in response to detecting the first magnetic tape drive being operated in the second mode initiating a switching from the second mode to the pass-through mode, in response to transfer of the requested data to the second magnetic tape drive initiating a switching from the pass-through mode to the second mode.

This may have the beneficial effect that the first magnetic tape drive may not only be operated in the pass-through mode, but may also provide standard functionality of known magnetic tape drives in the second mode, i.e., reading and writing data from and to a magnetic tape mounted into the respective magnetic tape drive without transferring data to another magnetic tape drive via a drive-to-drive network connection.

According to various embodiments, the second magnetic tape drive comprises at least two ports, the ports are operable in a first mode, pass-through mode, such that a first one of the ports is operated as a receiving port of the first magnetic tape drive and a second one of the ports is simultaneously operated as a sending port of the first magnetic tape drive, in response to detecting the second magnetic tape drive being operated in the pass-through mode, the initiating of the network connection between the first and the second magnetic tape drive further comprises:

the network connection being initiated between the receiving port of the second magnetic tape drive and a sending port of the first magnetic data drive, and the initiating of the transfer of the requested data from the second magnetic tape drive to the first computer system further comprises:

controlling the second tape drive to transfer the requested data being transferred to the first computer system via the sending port.

This may have the beneficial effect that also the second magnetic tape drive may be used as a switch for establishing a connection from the first magnetic tape drive to the first computer device.

According to various embodiments, the at least two ports of the second magnetic tape drive further are operable in a second mode such that both ports are operated as receiving or sending ports, the method further comprises:

in response to detecting the second magnetic tape drive being operated in the second mode initiating a switching from the second mode to the pass-through mode, in response to the transfer of the requested data to the first computer system initiating a switching from the pass-through mode to the second mode.

This may have the beneficial effect that also the second magnetic tape drive may not only be operated in the pass-through mode, but may further provide a standard functionality of known magnetic tape drives in the second mode, i.e., reading and writing data from and to a magnetic tape mounted into the respective magnetic tape drive without transferring data to another magnetic tape drive via a drive-to-drive network connection.

According to various embodiments, the second magnetic tape drive comprises more than two ports, a first set of one or more ports is connectable to the first magnetic tape drive, a second set of one or more ports is connectable to the first computer system, the method further comprises: in the pass-through mode selecting a port of the first set of ports to be operated as the receiving port of the second magnetic tape drive and a port of the second set of ports to be simultaneously operated as the sending port of the second magnetic tape drive.

This may have the beneficial effect of allowing a dynamical selection of the suitable ports for the data transfer.

According to various embodiments, the method further comprises: selecting the receiving and the sending port from the first and second set of ports based on the data transfer performance provided by the ports of the two sets.

This may have the beneficial effect that it allows selecting the ports with the best performance, e.g., the ports enabling the fastest data transfer. These may be, for example, Fibre channel ports.

According to a further aspect, a computer program product for transferring data from a first magnetic tape drive of a first magnetic tape library to a first computer system. The first computer system is connectable to a second magnetic tape drive of a second magnetic tape library. Data transfer between the first and second magnetic tape drive being controlled by a data transfer management component. The computer program product comprises a computer readable storage medium having program instructions embodied therewith. The program instructions executable by a processor are adapted to cause the processor to control the data transfer management component to:

receive a data transfer request for transferring data accessible by the first magnetic tape drive to the first computer system, and in response to receiving the data transfer request to:
initiate a network connection between the first and the second magnetic tape drive,
initiate an access to the requested data by the first magnetic tape drive,
initiate a transfer of the requested data from the first to the second magnetic tape drive via the network connection,
initiate a transfer of the requested data from the second magnetic tape drive to the first computer system.

Embodiments of the computer program product may comprise computer-executable instructions for performing each embodiment of the method for data transfer disclosed herein.

According to a further aspect, a data transfer management computer system for transferring data from a first magnetic tape drive of a first magnetic tape library to a first computer system is provided. The first computer system is connectable to a second magnetic tape drive of a second magnetic tape library. Data transfer between the first and second magnetic tape drive via the network connection is controlled by the transfer management computer system. The transfer management computer system comprises a memory for storing machine executable instructions and a processor for executing the machine executable instructions. Execution of the machine executable instructions by the processor causes the processor to control the data transfer management computer system to:

receive a data transfer request for transferring data accessible by the first magnetic tape drive to the first computer system, and in response to receiving the data transfer request to:
initiate a network connection between the first and the second magnetic tape drive,
initiate an access to the requested data by the first magnetic tape drive,
initiate a transfer of the requested data from the first to the second magnetic tape drive via the network connection,
initiate a transfer of the requested data from the second magnetic tape drive to the first computer system.

Embodiments of the data transfer management computer system may be configured for performing each embodiment of the method for data transfer disclosed herein.

DETAILED DESCRIPTION

Figure 1:
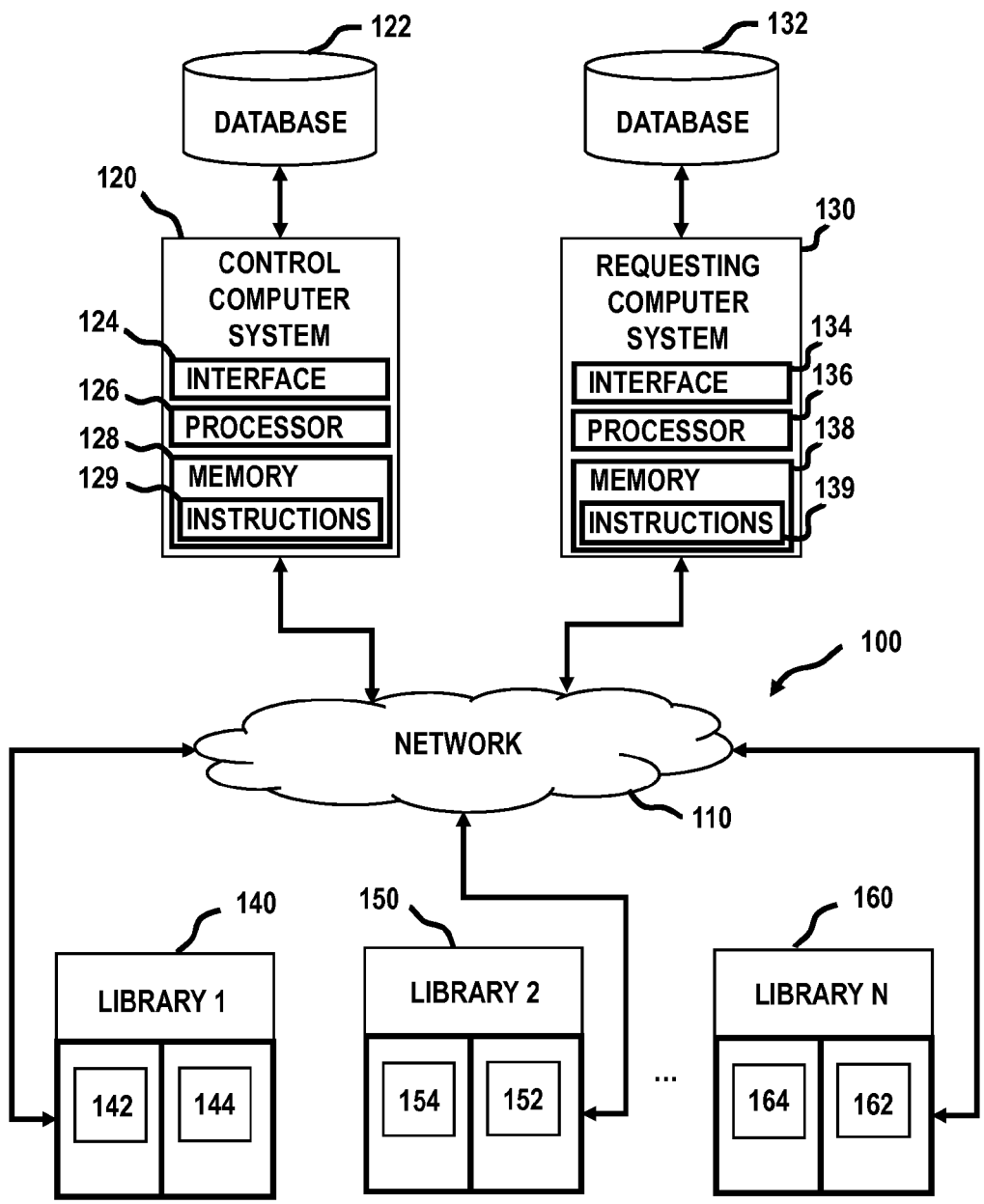
FIG. 1 depicts a schematic diagram illustrating an exemplary set of magnetic tape libraries connected via a network, according to an embodiment of the present invention.

The present invention may further include the following example features:

According to various embodiments, the first magnetic tape library being connected to a third magnetic tape library via a mechanical pass-through connection for mechanically transporting magnetic tapes from the third to the first magnetic tape library, the third magnetic tape library comprising the first magnetic tape, the method further comprising: initiating a mechanical transport of the first magnetic tape from the third magnetic tape library to the first magnetic tape library via the mechanical pass-through connection.

This may have the beneficial effect that in case the library in which the first magnetic tape is stored does not comprise a magnetic tape drive which is configured to be connectable via a network connection with the second magnetic tape drive, the first magnetic tape may be transported mechanically to an adjacent magnetic tape library, i.e., the first magnetic tape library, comprising a magnetic tape drive connectable via a network connection, i.e., the first magnetic tape drive. Thus, considering a data center comprising a plurality of magnetic tape libraries connected with each other by mechanical magnetic tape cartridge pass-through devices, not all of the libraries may have to be provided with a magnetic tape drive connectable via a network connection in order to provide data to a second magnetic tape drive.

According to various embodiments, the method further comprises:
in response to the mounting of the first magnetic tape into the first magnetic tape drive initiating a queuing of data access commands to the first magnetic tape drive,
in response to the unmounting of the first magnetic tape ending the respective queuing of data access commands.

This may have the beneficial effect that an unhindered data access from the first computer system to the data of the first magnetic tape in the first magnetic tape drive is provided, while other data access commands have to wait.

According to various embodiments, the method further comprises:
in response to the mounting of the first magnetic tape into the first magnetic tape drive initiating a blocking of data access commands for accessing data via the first magnetic tape drive received from a third computer system,
in response to the unmounting of the first magnetic tape ending the respective blocking of data access commands received from the third computer system.

This may have the beneficial effect that for a third computer system, e.g., a backup server, trying to access the first magnetic tape drive the respective magnetic tape drive may become temporarily inaccessible or even invisible for a third computer system during the data transfer. Thus, an interference of the third computer system, e.g., a backup server trying to access the respective magnetic tape drive for performing a backup, may be prevented.

According to various embodiments, the selecting further comprising:
in case the magnetic tape library comprising the requested data comprises no magnetic tape drive connectable to the second magnetic tape drive via a network connection, initiating a querying of a first connection database comprising an inventory of magnetic tape drives of the set of magnetic tape libraries connectable to the second magnetic tape drive via a network connection and of establishment of mechanical pass-through connections between the magnetic tape libraries of the set of magnetic tape libraries,
in response to an identification of a magnetic tape drive connectable to the second magnetic tape drive via a network and comprised by a library connected with the magnetic tape library comprising the requested data via one of the established mechanical pass-through connections, selecting the identified magnetic tape drive to be the first magnetic tape drive and the magnetic tape library comprising the identified magnetic tape drive to be the first magnetic tape library.

This may have the beneficial effect that in case a set of magnetic tape libraries connected with each other via mechanical tape cartridge pass-through devices comprises a plurality of magnetic tape drives being connectable via a network connection, the source magnetic tape drive, i.e., the first magnetic tape drive, may be dynamically selected. According to various embodiments, the first magnetic tape drive is selected such that time required for mechanical transporting the magnetic tape to the first magnetic tape drive is minimized.

According to various embodiments, the first magnetic tape drive comprising more than two ports, a first set of one or more ports being connectable to the second magnetic tape drive, a second set of one or more ports being connectable to the second computer system, the method further comprising in the pass-through mode selecting a port of the first set of ports to be operated as a receiving port of the first magnetic tape drive and a port of the second set of ports to be simultaneously operated as a sending port of the first magnetic tape drive.

According to various embodiments, the method further comprises: selecting the receiving and the sending port from the first and second set of ports based on the data transfer performance provided by the ports of the two sets.

According to various embodiments, the requested data may be provided to the first magnetic tape drive from a third magnetic tape drive of a third magnetic tape library. Thus, depending on the location of the requested data and the mechanical and/or network connections, an efficient transport route for the data to the first computer system via a plurality of magnetic tape drives may be selected.

According to various embodiments, the method further comprising: receiving the data transfer request from the second computer system.

This may have the beneficial effect that the transfer procedure for transferring the requested data to the first computer system is initiated by the first computer system, i.e., it may be initiated upon necessity.

According to various embodiments, the method further comprising: receiving the data transfer request from the first computer system.

This may have the beneficial effect that the transfer procedure for transferring the requested data to the first computer system may also be initiated by the source of the data. Thus a bidirectional communication may be established with the first and second computer system initiating data transfers.

According to various embodiments, the network connection initiated between the first and second magnetic drive is a bidirectional connection. This may have the beneficial effect not only be transferred in one direction, e.g., from the first magnetic tape or the second computer system to the first computer system, but also in two directions, e.g., from the computer system to the first magnetic tape or the second computer system. Thus, data may be provided from the first magnetic tape drive to the second magnetic tape drive e.g., in responds to a data request from a first computer system connected with the second magnetic tape drive. The network connection between the first and second magnetic drive may also be used for a data transfer in the reverse direction. In case a computer system connected to the second magnetic tape drive requests data accessible by the first magnetic tape drive an analogous data transfer may be performed in the reversed direction.

According to various embodiments, the method further comprising:
   initiating in response to receiving the data transfer request a mounting of a second magnetic tape into the second magnetic tape drive, the initiating of the transfer of the requested data to the second magnetic tape drive further comprising:
   initiating a storing the requested data onto the second magnetic tape by the second magnetic tape drive, the initiating the transfer of the requested data to the first computer system comprising:
   initiating a reading of requested data to be transferred to the first computer system from the second magnetic tape.

This may have the beneficial effect that it allows to store data received by the second magnetic tape drive in case the respective data is not directly transferred to the first computer system. This may be, for example, advantageous in case a second magnetic tape drive only comprises one port for sending and/or receiving data. Thus, data may be received and then the port may be switched from a receiving mode to a sending mode and the previously received data may be further transferred to the first computer system.

According to various embodiments, the method further comprising: in response to the transfer of the requested data to the first computer system initiating a deletion of the requested data from the second magnetic tape.

This may have the beneficial effect that the second magnetic tape drive may be reused for further data transfers or other tasks, such as backup tasks.

According to various embodiments, magnetic tape drives within a magnetic tape library may be prioritized for backup priority or data transfer priority.

According to various embodiments, the method further comprises: in response to the storing of the requested data on the second magnetic tape initiating an update of the file database.

This may have the beneficial effect that the file database is kept up-to-date.

According to various embodiments, the method further comprises: in response to the storing of the requested data on the second magnetic tape initiating a restriction of the write access to the second magnetic tape.

This may have the beneficial effect that the data stored on the second magnetic tape may be prevented from being overwritten by another computer system, such as a backup server trying to perform a backup task.

According to various embodiments, the second computer system sending the data transfer request for transferring the requested data being one of a set of computer systems connectable to the first magnetic tape drive.

According to various embodiments, the second computer system is one of a set of computer systems connectable to the first magnetic tape drive, the method further comprises in response to receiving the data transfer request:
   initiating a querying of a computer system database comprising an inventory of the data files comprised by the computer systems of the respective set of set of computer systems for the requested data,
   in response to an identification of a computer system comprising the requested data, selecting the identified computer system drive to be the second computer system.

This may have the beneficial effect that the second computer system may be dynamically selected.

According to various embodiments, the method further comprises: in response to the transfer of the requested data to the first computer system initiating an update of the computer system database indicating that the first computer system comprises the requested data.

This may have the beneficial effect that the file database is kept up-to-date.

According to various embodiments, the method further comprises:
   in response to the mounting of the first magnetic tape into the first magnetic tape drive initiating a blocking of data access commands for accessing data via the first magnetic tape drive received from a third computer system,
   in response to the unmounting of the first magnetic tape ending the respective blocking of data access commands received from the third computer system.

This may have the beneficial effect that the second magnetic tape drive becomes inaccessible or even invisible for other computer systems during the data transfer. Thereby, an interference caused by other computer systems trying to access the second magnetic tape drive during the data transfer may be prevented.

FIG. 1 depicts a schematic block diagram of a first exemplary magnetic tape library infrastructure 100 comprising a plurality of magnetic tape libraries 140, 150, 160. The magnetic tape library infrastructure 100 may be, for example, part of a storage cloud infrastructure. Alternatively, the magnetic tape library infrastructure may comprise individual direct and/or indirect network connections and may not be part of a storage cloud. Each magnetic tape library 140, 150, 160 may comprise one or more magnetic tape drives 142, 152, 162. Furthermore, each magnetic tape library 140, 150, 160 may comprise one or more magnetic tapes 144, 154, 164, i.e., magnetic tape cartridges comprising magnetic tapes. The magnetic tape libraries 140, 150, 160 may be multi-frame, e.g., dual frame libraries. The data transfer management computer system 120 may detect the magnetic tape drives 142, 152 which are configured to transfer data drive-to-drive via a network connection.

The data transfer management computer system 120 (also referred to herein as the control computer system 120) may comprise an interface 124 for controlling the magnetic tape libraries 140, 150, 160 and communicating with the requesting computer system 130 via the network 110. Interface 124 may comprise an indirect connection to magnetic tape library 140, 150, 160 by connecting to one or more tape drives 142, 152, 162. For example, the magnetic tape drives may act as a proxy for communication between the data transfer management computer system 120 and magnetic tape libraries 140, 150, 160. The data transfer management computer system 120 may further comprise a processor 126 and a memory 128 comprising machine-executable instructions 129. Execution of the machine-executable instructions 129 by the processor 126 may cause the processor 126 to control the present method for transferring data. The data transfer management computer system 120 may provide network connection information and a routing matrix for establishing a connection between a source magnetic tape drive 142 providing data and a target magnetic tape drive 152 for receiving data and transferring the received data to a computer system 130 requesting the respective data. A data transfer management component may comprise one or more data transfer management computer systems 120. For example, there may be more than one data transfer management computer system 120 and the function that data transfer management computer system 120 provides may be distributed among the more than one data transfer management computer system 120. Alternatively, a data transfer management component may comprise an application, program, thread, process, module, function, or other software structure running on requesting computer system 130. In this example, there may not be a data transfer management computer system 120 and the function that it provides may be provided by the requesting computer 130. Alternatively, a data transfer management component may comprise an application, program, thread, process, module, function or other software structure running on magnetic tape library 140, 150 or 160, or a combination thereof. In this example, there may not be a data transfer management computer system 120 and the function that it provides may be provided by magnetic tape library 140, 150 or 160, or a combination thereof.

The requesting computer system 130 may comprise an interface 134 for communicating with the magnetic tape drive 152 of the second magnetic tape library 150 via the network 110. The requesting computer system 130 may further comprise a processor 136 and a memory 138 comprising machine-executable instructions 139. Execution of the machine-executable instructions 139 by the processor 136 may cause the processor 136 to send a data transfer request to the control computer system 120. The requested data may be, for example, required for performing an analytic task. The received data may be stored in the database 132 for further processing.

The first magnetic tape library 140 comprises a first magnetic tape drive 142 which is connectable via a network 110 with a second magnetic tape drive 152 of the second magnetic tape library 150. The data transfer between the first magnetic tape drive 142 and the second magnetic tape drive 152 are controlled by a data transfer component provided by the control computer system 120. The magnetic tape library infrastructure 100 may comprise further libraries 160 with magnetic tape drives 162. The control computer system 120 may be connected with a database 122, which may comprise an inventory of the storage locations of the data files comprised by the first and second magnetic tape libraries 140, 150. Upon receiving a data request from a first requesting computer system 130, the control computer system 120 may control the data transfer between the first magnetic tape drive 142 and the second magnetic tape drive 152 via the network 110 such that the requested data is transferred from the first magnetic tape drive 142 to the second magnetic tape drive 152 and further on to the requesting computer system 130. The requesting computer system 130 may store the requested data received from the second magnetic tape drive 152, for example in a database 132. In one embodiment, this provides a virtual drive for effectively mounting a cartridge to a drive that is not physically available to mount that cartridge, thus preserving the ability to mount any cartridge to any drive. For example, magnetic tape library 140 and magnetic tape library 150 may be seen to the host application as one large library which comprises magnetic tape drive 142 and magnetic tape drive 152. When the host application requests to move a magnetic tape from magnetic tape library 140 to magnetic tape drive 152 in library 150, there is no physical path to complete the move operation. The magnetic tape and the magnetic tape drive are in two different libraries with no physical pass-through mechanism. Data transfer management computer system 120 instructs magnetic tape library 140 to move the cartridge to magnetic tape drive 142 and then creates a data transfer connection between magnetic tape drive 142 and magnetic tape drive 152. This connection allows the host application to read/write data from/to the magnetic tape as though that tape were mounted in magnetic tape drive 152. Creating or initiating the data transfer connection may comprise information about the network path or address of the drive. For example, a data transfer management component may instruct magnetic tape drive 142 to establish a data transfer connection with magnetic tape drive 152 and may provide the address or network path on which magnetic tape drive 152 can be found. Alternatively, a data transfer management component may instruct magnetic tape drive 152 to establish a data transfer connection with magnetic tape drive 142 and may provide the address or network path on which magnetic tape drive 142 can be found. Still further, a data transfer management component may instruct magnetic tape drive 142 to establish a data transfer connection with magnetic tape drive 152 and it may instruct magnetic tape drive 152 to establish a data transfer connection with magnetic tape drive 142. In one embodiment, control computer system 120 provides the network path between the magnetic tape drives. In another embodiment, requesting computer system 130 provides the network path between the magnetic tape drives. In another embodiment, magnetic tape library 140 and/or magnetic tape library 150 provides the network path between the magnetic tape drives. In another embodiment, the drives are connected via one or more network links without any involvement from control computer system 120, requesting computer system 130, magnetic tape library 140, or magnetic tape library 150. In another embodiment, the network path is not provided by any of the above.

The data transfer management computer system 120 may have access to or comprise one or more file databases 122. The file database may be, for example, provided by a backup file database of a backup application server within a storage cloud infrastructure. If a file is requested by computer system 130, the data transfer management computer system 120 queries the respective file database 122 to locate the requested file and the magnetic tape cartridge comprising the respective file. With this information the data transfer management computer system 120 accesses the magnetic tape library 140 which comprises the magnetic tape cartridge with the requested file and starts a transfer of the respective file via magnetic tape drive 142 to a magnetic tape drive 152 of the target magnetic tape library 150 configured as file transfer magnetic tape drive.

In case one or more of the magnetic tape drives 142, 152, 162 provide more than one network interface of the same or different interface standards, a routing function may be applied to the respective multi-interface drive by the data transfer management computer system 120. The routing function may enable the magnetic tape drives to route data received on one port directly to another port with and without mounting a magnetic tape for processing. The data transfer management computer system 120 may specify whether a magnetic tape for processing is mounted or not.

In order to prevent requesting computer system 130 from performing a cartridge movement to magnetic tape drive 142 while it is performing a data transfer connection with magnetic tape drive 152, control computer system 120, magnetic tape library 140, magnetic tape library 150 and/or magnetic tape drive 142 may queue or delay any commands that require access to magnetic tape drive 142. Another method to prevent resource conflict of magnetic tape drive 142 is for control computer system 120, magnetic tape library 140, magnetic tape library 150, and/or magnetic tape drive 142 to show the drive as busy or inaccessible while it has a data transfer connection established. Thus, the magnetic tape drive 142 is temporary unavailable other tasks like backup activities initiated by other computer systems like backup computer systems. After the requested file has been transferred to a target magnetic tape drive 152, computer systems assigned to this magnetic tape drive 142 may continue to use the respective magnetic tape drive 142 for direct read/write processes, like backup tasks, without data transferred to or from other magnetic tape drive 152, 162 of other magnetic tape libraries 150, 160. Thus, the respective magnetic tape drive 142 becomes available for other computer systems. Another method to prevent resource conflict of magnetic tape drive 142 is to utilize spare or additional drives that are not visible to the host application running on requesting computer system 130 as magnetic tape drives. This method has the benefit of slowing down or delaying the use of magnetic tape drive 142 by a host application running on requesting computer system 130, but it has the added cost of providing additional drives for data transfer connections.

The magnetic tape drives 142, 152 configured as data file transfer devices with one of following priority setting: data file transfer only, backup priority, or data file transfer priority. The magnetic tape libraries may comprise further magnetic tape drives 162 with backup only status. These priority settings allow dynamic scaling and load balancing between backup activities and data file transfer activities within the magnetic tape library infrastructure 100.

High density pass-through (HD-P) import/export elements (IEE) may be used as mechanical pass-through station addresses, the IEE range of a magnetic tape library may comprise a plurality of IEE addresses or mechanical pass-through station addresses, e.g., 256.

Magnetic tape drives 142, 152, 162 may comprise a single Fibre Channel port, two Fibre Channel ports, Ethernet ports, one or two SAS (Serial Attached Small Computer System Interface (SCSI)) network ports and/or other interfaces for transferring data.

Figure 2:
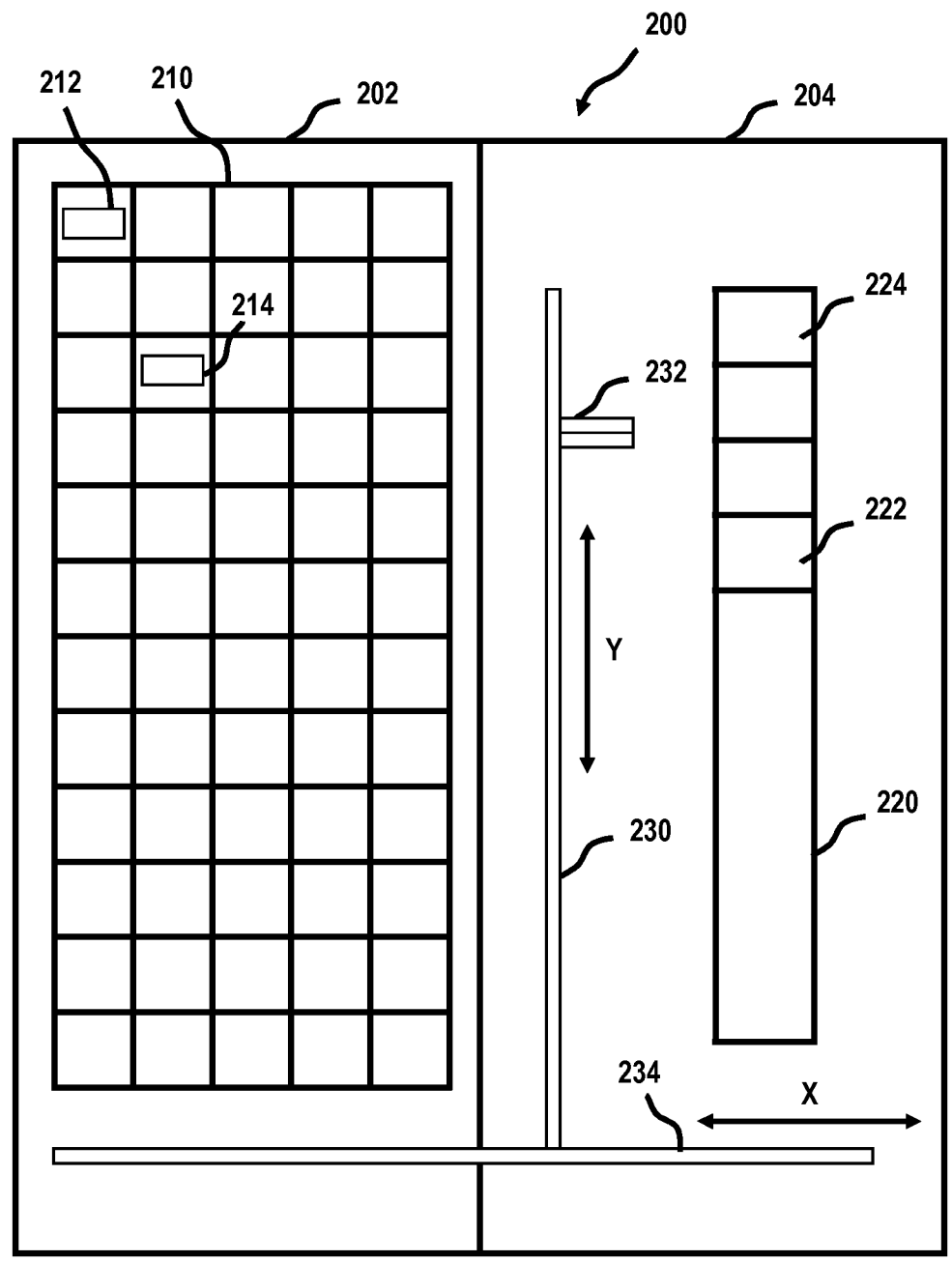
FIG. 2 depicts a schematic diagram illustrating an exemplary magnetic tape library, according to an embodiment of the present invention.

FIG. 2 depicts a schematic diagram of an exemplary dual frame magnetic tape library 200 with a first frame 202 and a second frame 204. The first frame comprises a plurality of magnetic tape cells 210, i.e., storage slots, in which magnetic tape cartridges 212, 214 are stored. The second frame 204 comprises a plurality of drive slots 220 with magnetic tape drives 222, 224. The plurality of magnetic tape drives 222, 224 comprises at least one magnetic tape drive 224 which is connectable via a network connection to a magnetic tape drive of another magnetic tape library. In order to transport the magnetic tape cartridges 212, 214 from the tape cells 210 to the magnetic drive slots 220 and back, an xy-accessor 230 is provided with a magnetic tape cartridge picker 232. The magnetic tape cartridge picker 232 is movable along the longitudinal axis of the xy-accessor in y-direction. Furthermore, the xy-accessor is movable in x-direction along the longitudinal axis of an x-rail 234. Thus the xy-accessor 230 may be moved from the x-rail 234 to the tape cells 210. The cartridge picker 232 may be moved along the y-direction to a magnetic tape drive 224 comprising requested data. The respective magnetic tape 214 is picked by the cartridge picker 232 and transported to the magnetic tape drive 224 by the xy-accessor 230.

Figure 3:
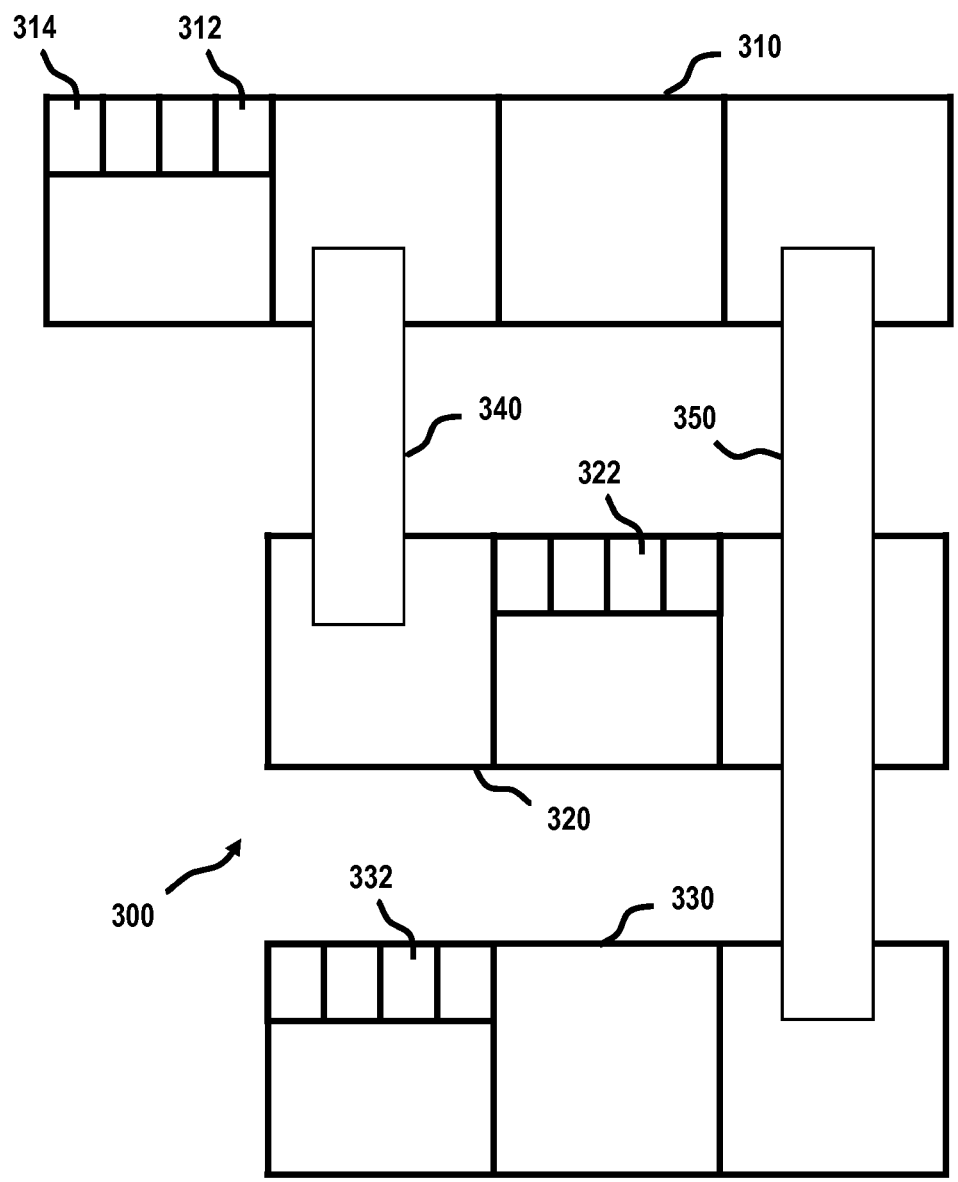
FIG. 3 depicts a schematic diagram illustrating an exemplary set of magnetic tape libraries connected via a mechanical pass-through mechanism, according to an embodiment of the present invention.

FIG. 3 depicts a schematic block diagram of a set of magnetic tape libraries 300. The set of magnetic tape libraries 300 comprises three multi-frame magnetic tape libraries 310, 320, 330 connected via mechanical magnetic tape cartridge pass-through devices 340, 350. Via the mechanical pass-through device 340 magnetic tape cartridges may be transported from the first magnetic tape library 310 to the second magnetic tape library 320 and vice versa by automated robotic devices. Via the mechanical pass-through device 350 magnetic tape cartridges may be transported between all magnetic tape libraries 310, 320, 330. Each of the three libraries 310, 320, 330 comprises a set of magnetic tape drives 312, 322, 332. In the example of FIG. 3, only the first magnetic tape library 310 comprises a magnetic tape drive 314 connectable via a network with a magnetic tape drive of another magnetic tape library (not depicted). In order to transfer data via a network connection provided by the first magnetic tape drive 314, a magnetic tape comprising the data to be transferred which is stored in the first magnetic tape library 310 may be mounted into the first magnetic tape drive 314. In case a cartridge is requested to be mounted to magnetic tape drive 312 in magnetic tape library 310, and that cartridge is stored either in the second magnetic tape library 320 or the third magnetic tape library 330, both of which do not comprise a magnetic tape drive connectable via the network, the respective magnetic tape is mechanically transported from the third or second magnetic tape library 330, 320 via the first or second pass-through device 340, 350 to the first magnetic tape library 310 and mounted into the first magnetic tape drive 312.

Figure 4:
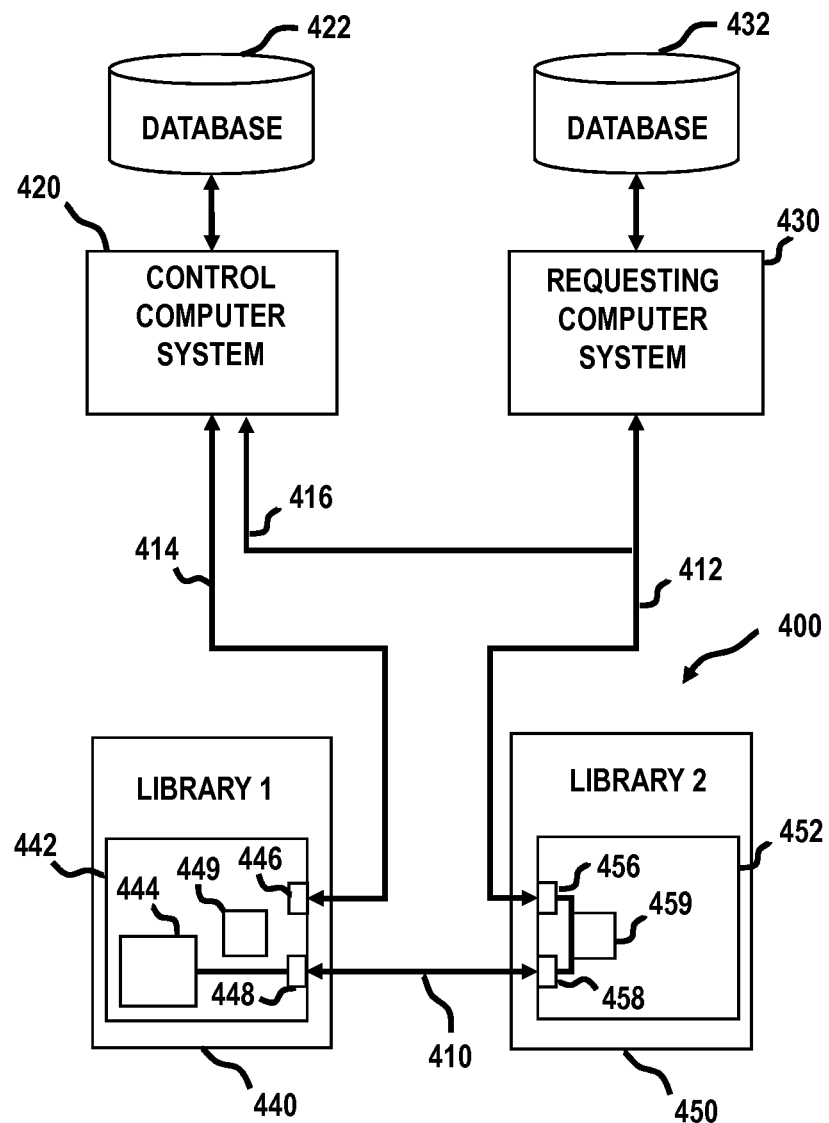
FIG. 4 depicts a schematic diagram illustrating an exemplary arrangement for transferring data from a first magnetic tape drive to a computer system via a second magnetic tape drive, according to an embodiment of the present invention.

FIG. 4 depicts a schematic diagram illustrating an exemplary arrangement 400 for transferring data from a first magnetic tape drive 442 to a computer system 430 via a second magnetic tape drive 452. The first and the second magnetic tape libraries 440, 450 each comprise a magnetic tape drive 442, 452. Both magnetic tape drives 442, 452 comprise two ports 446, 448, 456, 458 each, e.g., two Fibre Channel ports. The data ports 448, 458 belonging to different magnetic drives 442, 452 of different magnetic tape libraries 440, 450, are connected to each other. The data ports 448, 458 may be, for example, connected with each other either directly via a wire or via one or more network switches. This allows a bidirectional bridge connection 410 of the two magnetic tape drives 442, 452. With this bidirectional bridge connection 410, the two magnetic tape drives 442, 452 provide a logical duct. Both magnetic tape drives 442, 452 may be configured as storage elements of their respective magnetic tape library 440, 450 and thereby be available for data retrieval. Via port 446 the data transfer management computer system 420 may control the first magnetic tape drive 442. Via port 456 the data transfer management computer system 420 may control the second magnetic tape drive 452 and data may be transferred to the requesting computer device. Alternatively, the magnetic tape drives 442, 452 may establish a data transfer connection via control computer system 420, requesting computer system 430, magnetic tape library 440, magnetic tape library 450, or through some other computer system or network path.

A magnetic tape cartridge comprising a magnetic tape 444 may be loaded from a storage location of the first magnetic tape library 440 into the first magnetic tape drive 442 located at a first end of the respective logical duct. Control commands may be sent to the second magnetic tape drive 452 connected to the second end of the duct by a data transfer management computer system 420 controlling data transfer between the two magnetic tape drives 442, 452. The control commands may be routed via a communication connection 414 to the first magnetic tape drive 442 containing the magnetic tape cartridge with the first magnetic tape 444.

The data transfer management computer system 420 may be supplemented by a file database 422 comprising an inventory of the data files comprised by the magnetic tapes of the magnetic tape libraries 440, 450. By providing the IDs of the cartridges comprising the magnetic tape files, the database 422 may provide the ability to access files of magnetic tapes stored in the magnetic tape libraries 440, 450. The transfer management computer system 420 may associate a virtualized storage element address to an available free magnetic tape drive 452 of the magnetic tape library connected with the data requesting computer system 430 and an available free magnetic tape drive 442 of the first magnetic tape library 440 storing the magnetic tape 444 with the requested data files. The magnetic tape library infrastructure 400 may allow retrieving data sets or individual data objects via the network connection 410 from magnetic tape library 440 by the via the magnetic tape library 450, while both libraries may be located at different global locations. Furthermore, the received data sets or individual data objects may be locally stored by storing the same e.g., in the database 432.

In a multiport magnetic tape drive, like the dual port magnetic tape drive 452 the functionality to pass through data received by a receiving port 458 to a sending port 456 may be, for example, added to the drive's firmware allowing the data transfer management computer system 420 to control the magnetic tape drive 450 to act as a sub-network switch or router providing a communication connection between the first library 440 and the second library 450. Thus, data objects may be transferred from a magnetic tape 444 mounted in the first magnetic tape drive 442 to the second magnetic tape drive 452 even without loading a magnetic tape into the second magnetic tape drive 452.

The configuration of the data object transfer connection 410 may be done dynamically. One or more object based transfer connections may be established between the magnetic tape libraries 440, 450 depending on the number of available free magnetic tape drives 442, 452 that are configured for a drive-to-drive data transfer and not used by other computer systems for other tasks like backup operations.

The magnetic tape drive 452 may further be configured to act in a second mode via each of the ports 456, 458 as a standard magnetic tape drive providing a control path for controlling a mounting and unmounting of magnetic tapes in the magnetic tape drive 452 as well as for reading and/or writing data to and/or from a mounted magnetic tape by a host computer system connectable to the respective port.

Data stored on magnetic tapes of the magnetic tape libraries 440, 450 may be stored in a compressed format. Each magnetic tape drive 442, 452 may comprise a compression module 449, 459, like a compression chip, for data compression and decompression. Data which is received by the magnetic tape drives 442, 452 in order to be written on a magnetic tape is compressed, while data sent by the magnetic tape drives 442, 452 is decompressed using the compression modules 449, 459. Within the bidirectional bridge provided by the connection 410 between the two magnetic tape drives 442, 452 the two build-in compression module 449, 459 may be controlled by data transfer management computer system 420 such that the compression module 449 is bypassed in order to prevent a decompression of the data sent via the network connection 410. The compression module 459 may be controlled such that the data sent via port 456 is decompressed before sending. Thus the data through put via the connection 410 may be increased due to the compression of the data transferred between the magnetic tape drives 440, 450.

The computer system 430, e.g., a Hadoop analytic server, may request via the data transfer management computer system 420 a specific file from a magnetic tape 444 located in the magnetic tape library 440. Upon receiving the request, the data transfer management computer system 420 queries information about the magnetic tape containing the requested file from a file database 422. The file database 422 may be a file base of the data transfer management computer system 420 comprising an inventory of all the files stored in the magnetic tape infrastructure 400. In order to compile the inventory, the data transfer management computer system 420 may access and query one or more backup file databases. According to various embodiments, the data transfer management computer system 420 may query file databases, like backup file databases of other systems without compile a database on its own.

The data transfer management computer system 420 may initiate a mounting of the magnetic tape cartridge with magnetic tape 444 containing the requested file from its storage element in the magnetic tape library 440 to the magnetic tape drive 442 configured for drive-to-drive data transfer. This may indicate for the source magnetic tape drive 442 configured for drive-to-drive data transfer to wait for a network connection 410 to be establish by the data transfer management computer system 420.

The data transfer management computer system 420 initiates the network connection 410 from the source magnetic tape drive 442 via a network, like a storage area network (SAN) and the target magnetic tape drive 452 connected with the data requesting computer system 430, e.g., a Hadoop analytic server. The data file transfer channel 410 provided by magnetic tape drive 452 may appear as an additional storage element within the library 450. Upon a load command of the new storage slot location, i.e., additional storage element, the magnetic tape drive 450 may be reconfigured by the data transfer management computer system 420 as a data file transfer device. As a result, the magnetic tape drive 450 may route all read and write requests from the requesting computer system 430 to the source magnetic tape drive 442. Thus, an application, like a Hadoop application, running on the computer system 430 may directly access the data located on magnetic tape 444 in the source magnetic tape drive 442.

In another example, a host application (e.g., Symantec NetBackup) is running on requesting computer system 430. The host application view of magnetic tape library 440 and 450 is one large library with all of the elements of both individual libraries combined (cartridges, storage slots, drives, drive slots, etc.). The host application communicates with magnetic tape drive 442 through port 446 (not shown), and it communicates with magnetic tape drive 452 through port 456. The host application communicates with the magnetic tape libraries 440, 450 through control computer system 420 via communication path 416. In this example, control computer system 420 acts as a library controller for the two magnetic tape libraries 440, 450. Alternatively, the host application could communicate with the magnetic tape libraries through their respective tape drives, utilizing logical unit numbers or LUNs as described above. In this example, one of the libraries 440, 450 would act as a library controller or both would act as a distributed library controller. The host application requests magnetic tape cartridge 444 to be mounted to magnetic tape drive 452. Control computer system 420 uses communication connection 414, or another communication path between control computer system 420 and magnetic tape library 440 (not shown), to instruct magnetic tape library 440 to move magnetic tape cartridge 444 from its storage location to magnetic tape drive 442. Control computer system 420 uses communication connection 414, or another communication path between control computer system 420 and magnetic tape library 440 (not shown), to instruct magnetic tape drive 440 to establish a data transfer connection with magnetic tape drive 452. Alternatively, magnetic tape library 440 could instruct magnetic tape drive 442 to establish a data transfer connection via a library to drive interface (not shown). Magnetic tape drive 452 responds to any host application requests as though magnetic tape cartridge 444 were mounted in magnetic tape drive 452. For example, any host application data access commands that are directed to magnetic tape drive 452 are forwarded by magnetic tape drive 452 to magnetic tape drive 442 via communication link 410 and any responses are forwarded by magnetic tape drive 442 to magnetic tape drive 452 via communication link 410. In this way, magnetic tape drive 452 is acting as a virtual magnetic tape drive for the magnetic tape cartridge loaded in magnetic tape drive 442.

Figure 5:
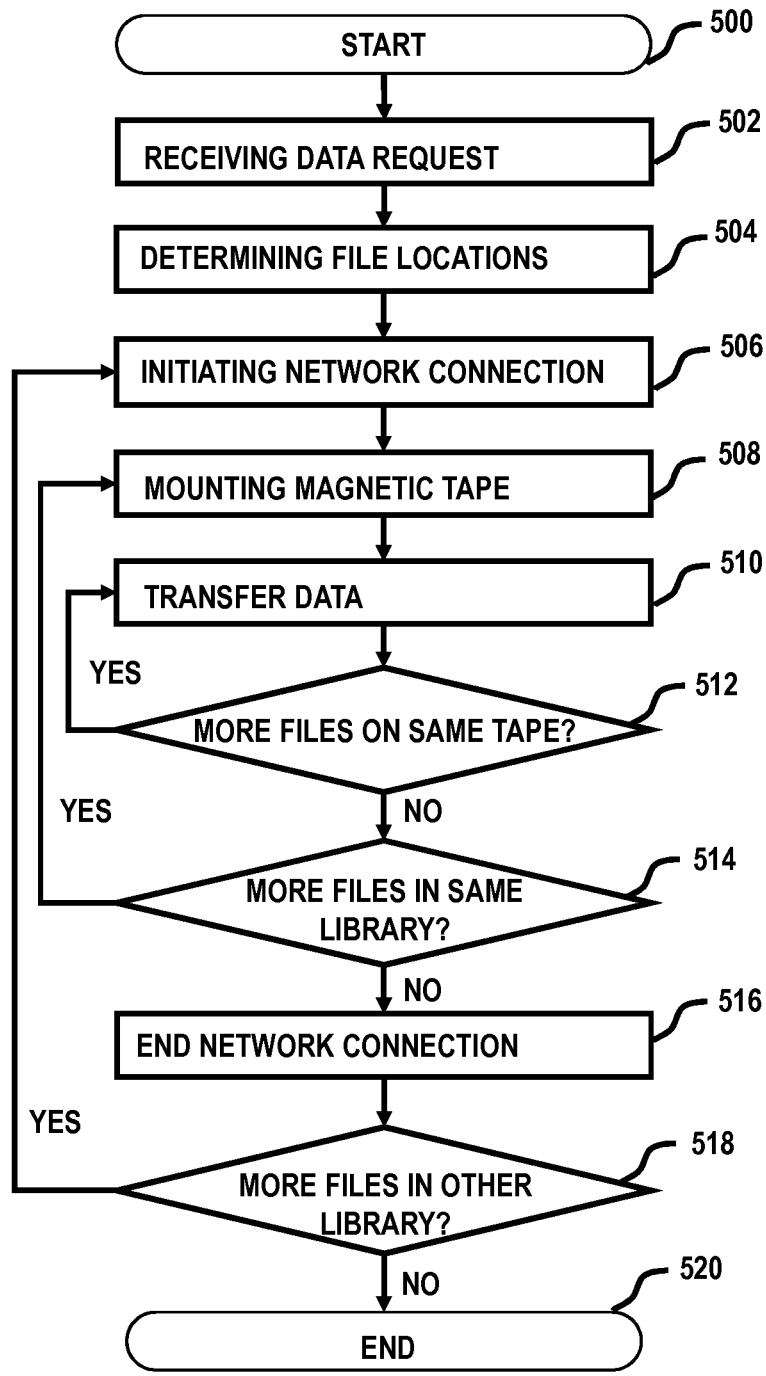
FIG. 5 depicts a schematic flow diagram of an exemplary first method for transferring data from a first magnetic tape drive to a computer system via a second magnetic tape drive, according to an embodiment of the present invention.

FIG. 5 depicts a first flow diagram of a first exemplary method for transferring a data from a first magnetic tape drive to a second magnetic tape drive via a network connection. In block 500 the method starts, in block 502 a data request is received, e.g., from a first computer system. This may comprise a request to move a magnetic tape cartridge from one location to another location. Alternatively, this may comprise a request for particular Volser (tape volume serial number). Still further, this may comprise a request for a file, object, data structure, etc. In block 504 the location of the requested data, e.g., the data files with the respective data and the magnetic tape drive comprising the same, are determined. Alternatively, this step may be omitted. For example, if the receiving data request 502 was a request to move a magnetic tape cartridge from one location to another location, then determining file locations 504 either would not be required or it would have been determined (e.g., by a host application) prior to the receiving data request 502 (e.g., from a host application). In block 506 a network connection between the second magnetic tape drive and the first magnetic tape drive is initiated. In the first magnetic tape library the magnetic tape comprising requested data is stored. In block 508 the respective magnetic tape comprising the requested data is mounted into the first magnetic tape drive. Alternatively, the order of blocks 506 and 508 may be reversed.

In block 510 the data file with the requested data is transferred from the first magnetic tape drive to the first computer system via the network connection established between the first and second magnetic tape drive. The data transfer may comprise data, files, objects, structures, etc. For example, it may comprise a tape drive read command, the results of a tape drive read command, a tape drive test unit ready (TUR) command, the results of a tape drive test unit ready command, etc. In another example, it may comprise the transfer of a file or other data object. In block 512 it is checked whether the magnetic tape mounted in the first magnetic tape drive in block 508 comprises further data files with requested data. In case the mounted magnetic tape comprises more files with requested data, the method continues in block 510. Otherwise, the method continues in block 514, where it is checked whether another magnetic tape of the same magnetic tape library comprises further data files with requested data. In case the respective magnetic tape library comprises a further magnetic tape with requested data, the respective magnetic tape is mounted into the first magnetic tape drive, thus replacing the previously mounted magnetic tape. The method continues in block 516, where the network connection is ended. In block 518 it is checked whether a magnetic tape with requested data is stored in another magnetic tape library. In case there is another magnetic tape library with a magnetic tape comprising requested data, the method continues in block 506. In case no other magnetic tape library with requested data is provided, the method ends in block 520. Alternatively, blocks 512, 514 and 518 may be omitted. For example, if the receiving data request 502 was a request to move a magnetic tape cartridge from one location to another location, then transfer data 510 involves magnetic tape access commands rather than file or other data object requests. In this example, the end network connection 516 block would occur after the host application was finished with the magnetic tape cartridge (e.g., after the magnetic tape cartridge is unloaded by the host application).

Figure 6:
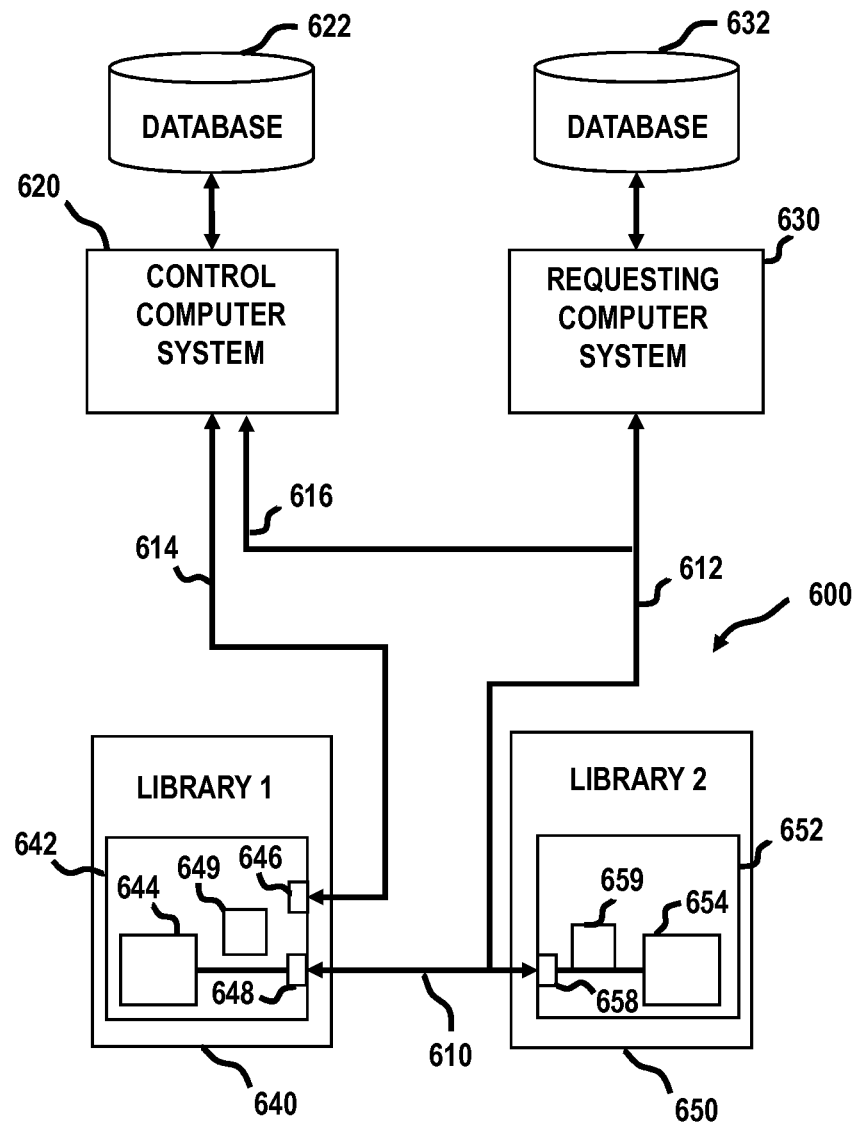
FIG. 6 depicts a schematic diagram illustrating an exemplary arrangement for transferring data from a first magnetic tape drive to a computer system via a second magnetic tape drive, according to an embodiment of the present invention.

FIG. 6 depicts a schematic diagram illustrating an exemplary arrangement 600 for transferring data from a first magnetic tape drive 642 to a computer system 630 via a second magnetic tape drive 652. The data transfer management computer system 620 may initiate a transfer of the data files requested by the computer system 630 from the magnetic tape 644 mounted in the magnetic tape drive 642 of magnetic tape library 640 to a magnetic tape 654 provided in the magnetic tape drive 652 of magnetic tape library 650.

In case of only a single port storage interface 658 the read and write requests from the requesting computer system 630 may not directly be routed by the magnetic tape drive 652 to the magnetic tape drive 642. The method for transferring data may be analog to the method for magnetic tape drives with multiport storage interfaces, like the dual port storage interface shown in FIG. 4, for data processing up to the mounting of the magnetic tape 644 containing the requested file. In a process parallel to the mounting of the magnetic tape 644 containing the requested file in magnetic tape drive 642, the data transfer management computer system 620 initiates a mounting of a magnetic tape 644 from magnetic tape library 640 into the magnetic tape drive 642 configured for a data transfer via network connection 610. This may indicate for the target magnetic tape drive 652 to wait for a network connection 610 to be initiated between the two magnetic tape drives 642, 652 by the data transfer management computer system 620.

The data transfer management computer system 620 may initiate the network connection 610 and the data transfer from the magnetic tape drive 642 to the magnetic tape drive 652. Upon finishing of the transfer process, the data transfer management computer system 620 initiates an unmounting of the source magnetic tape 644 which is moved back from the source magnetic tape drive 642 to its designated storage element in the magnetic tape library 640. In a parallel process the data transfer management computer system 620 may end the network connection 610. Thus, the availability for usage of the source magnetic tape drive 642 is reestablished and magnetic tape drive 642 may operate in a second mode as a standard magnetic tape drive.

The data provided by the magnetic tape 642 may be provided in a compressed format. The compressed data is bypassing the data the compression module 649. Thus, the data transferred to the second magnetic tape drive is transferred in a compressed format, which is faster due to the smaller amount of data to be transferred. The data provided via the network connection 610 is written in compressed format optionally bypassing the compression module to the magnetic tape 654. When being transferred to the requesting computer system 630 the compressed data may be decompressed.

The data transfer management computer system 620 may update the file databases indicating that the magnetic tape 654 in the target magnetic tape drive 652 contains the requested file. Furthermore, it may assign a private status to the target magnetic tape 652 restricting access to the files stored thereon. Assigning the respective magnetic tape 652 with a private status may e.g., indicate to backup applications not to use the respective magnetic tape 652 for new backup tasks.

The data transfer management computer system 620 may further initiate a rewinding of the target magnetic tape 654 in the target magnetic tape drive 652. Thus, the availability for usage of the target magnetic tape drive 652 by the computer system 630 requesting the file for data reading operations is reestablished. The data transfer management computer system 620 confirms the fulfillment of the file request the computer system 630, thereby indicating to the application running on the computer system 630, which has requested the respective file, to read the requested file from the magnetic tape drive 652 to the database 632 of the computer system 632. Thus, a reading of the requested file from the magnetic tape 654 mounted in the magnetic tape drive 652 may be initiated completing the data transfer from the magnetic tape drive 640 to the computer system 630.

Figure 7:
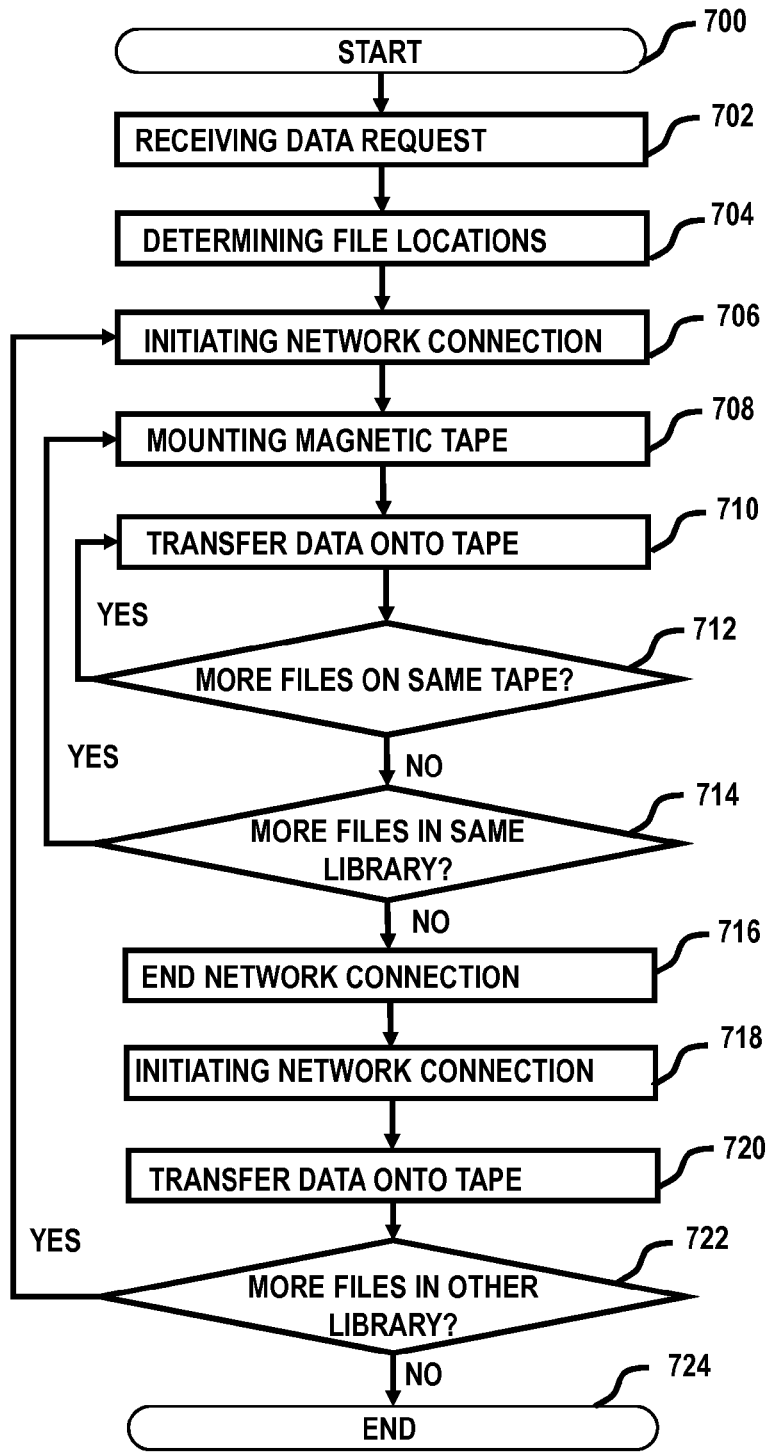
FIG. 7 depicts a schematic block diagram of an exemplary second method for transferring data from a first magnetic tape drive to a computer system via a second magnetic tape drive, according to an embodiment of the present invention.

FIG. 7 depicts a second exemplary flow diagram of the second method. In block 700 the method starts, in block 702 a data request is received and in block 704 the storage location of the requested data is determined. In block 706 a network connection between the second magnetic tape drive and a first magnetic tape drive of a magnetic tape library comprising a magnetic tape with requested data is initiated. In block 708 a magnetic tape is mounted into the second magnetic tape drive. Furthermore, a magnetic tape comprising requested data is mounted into the first magnetic tape drive. In block 710 the requested data is transferred from the magnetic tape in the first magnetic tape drive via the network connection to the second magnetic tape drive. In block 712 it is determined whether the magnetic tape in first magnetic tape drive comprises more files with requested data. In case the respective magnetic tape comprises more data files with requested data, the method continues in block 710. In case the respective magnetic tape does not comprise more data files with requested data, the method continues in block 714, where it is checked whether the first magnetic tape library comprises further magnetic tapes with data files comprising requested data stored therein. In case the magnetic tape library comprises further magnetic tapes with relevant data files, the method continues in block 708, where the further magnetic tape is mounted into the first magnetic tape drive by replacing the magnetic tape previously located therein. In case the respective magnetic tape library does not contain any further magnetic tapes with requested data, the network connection is ended in block 716.

In block 720 the transferred data stored on the second magnetic tape is transferred via the second magnetic tape drive to the first computer system. In block 722 it is checked whether there is any other magnetic tape library comprising a magnetic tape with requested data. In case there is another magnetic tape library with such data, the method continues in block 706, where a network connection between magnetic tape drive of said magnetic tape library with a magnetic tape drive of the other magnetic tape library comprising requested data is initiated. In block 723 the data stored on the second magnetic tape is deleted. In block 724 the method ends.

Figure 8:
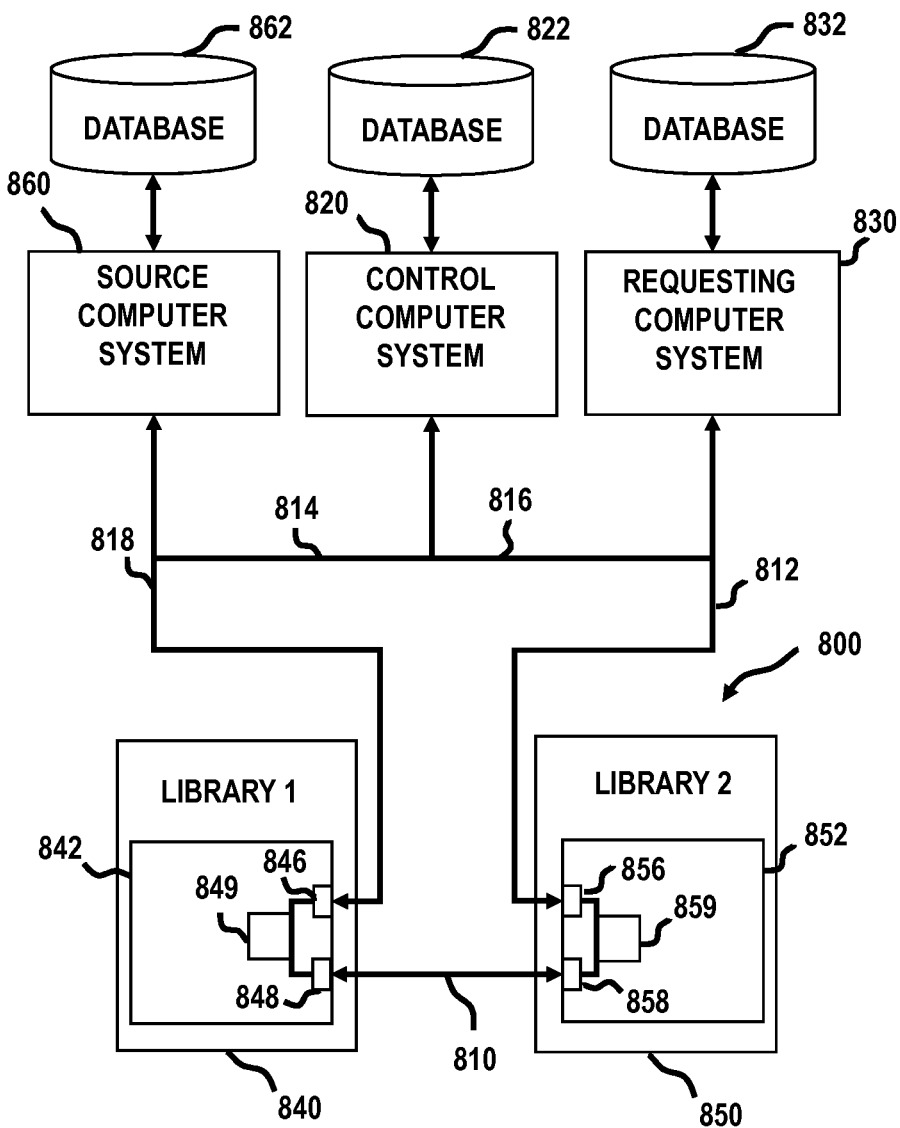
FIG. 8 depicts a schematic diagram illustrating an exemplary arrangement for transferring data from a second computer system to a first computer system via a pair of magnetic tape drives, according to an embodiment of the present invention.

FIG. 8 depicts a schematic diagram illustrating an exemplary arrangement 800 for transferring data from a second computer system 860 to a first computer system 830 via a pair of magnetic tape drives. The second computer system 860 further comprises or may be provided with access to a database 862. The arrangement corresponds to the one shown in FIG. 4, but with no magnetic tape mounted in the magnetic tape drive 842. Requested data is transferred via the two magnetic tape drives 842, 852 from the source computer system 860 and the target computer system 830 and vice versa. The data transfer is controlled by the data transfer management computer system 820. Both pairs of ports 846, 848; 856, 858 implement a switch. The data sent to magnetic tape drive 842 is compressed using the compression module 849. When being transferred from the second magnetic tape drive to the requesting computer system 830, the data is decompressed again. Due to the compression, data sent via the network connection 810 may have a being faster transferred.

Figure 9:
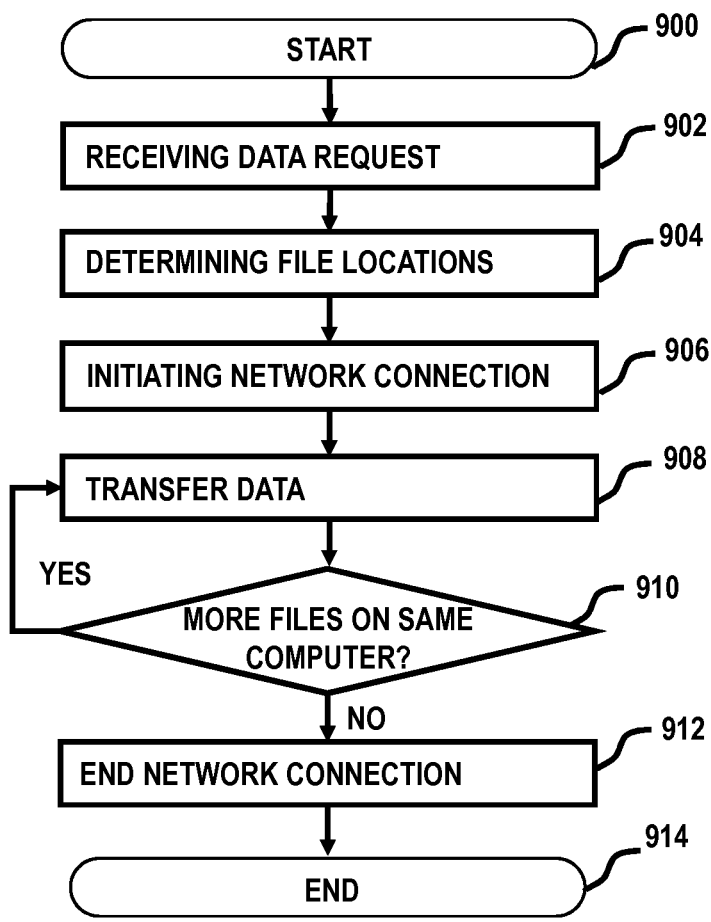
FIG. 9 depicts a schematic block diagram of an exemplary method for transferring data from a second computer system to a first computer system via a pair of magnetic tape drives, according to an embodiment of the present invention.

FIG. 9 depicts a schematic block diagram of an exemplary method for transferring data from a second computer system to a first computer system via a pair of magnetic tape drives. In block 900 the method starts, in block 902 a data request is received and in block 904 the storage location, i.e., computer system, of the requested data is determined. In block 906 a network connection between the second magnetic tape drive and a first magnetic tape drive is initiated. In block 908 the requested data is transferred from the second computer system to the first computer system via the network connection between the two magnetic tape drives. In block 910 it is determined whether there are more files with requested data on the same computer. In case the second computer system comprises more data files with requested data, the method continues in block 908. In case the second computer system does not comprise more data files with the requested data, the method continues in block 912, where the network connection is ended. In block 914, the method ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be mounted onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending in response the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention are described as comprising magnetic tape drives. However, any data storage drive may be used. A data storage drive is a device, module, circuit, etc. that can read and/or write data to/from a removable memory component or device. For example, and without limitation, data storage drives may comprise hard disk drives, tape drives, solid state drives (SSD), flash memory drives, optical disk drives, optical tape drives, etc.

Aspects of the present invention are described as comprising magnetic tape cartridges. However, any data storage cartridge may be used. A data storage cartridge is a moveable/removable storage medium that may or may not be housed in a casing, container, package, etc. For example, and without limitation, data storage cartridges may comprise magnetic tape, magnetic disk, hard disk drive, solid state disk, solid state disk drive, optical disk, optical tape, flash memory, MEMS (Micro-Electro-Mechanical Systems) based storage, RAM, DRAM, etc.

Aspects of the present invention are described as comprising magnetic tape libraries. However, any data storage library may be used. A data storage library is a device or system capable of moving data storage cartridges to or from a data storage drive.

Aspects of the present invention are described as comprising Ethernet and/or Fibre Channel links, connections, ports or networks. However, any network connection may be used. A network connection is a communication component, protocol, link medium, or topology for moving data from one device to another device. For example, and without limitation, a network connection may comprise Ethernet, Fibre Channel, FICON (Fibre Connection), USB (Universal Serial Bus), Wi-Fi, Wi-MAX, WLAN, Hiper-LAN, Hiper-MAN, cellular networks, satellite communications, Bluetooth, ZigBee, other wired links, other wireless radio links, other wireless optical links, wireless induction links, etc.

Possible combinations of features described above can be the following:
1. A method for transferring data from a first data storage drive of a first data storage library to a first computer system, the first computer system being connectable to a second data storage drive of a second data storage library, data transfer between the first and second data storage drive being controlled by a data transfer management component, the method comprising:

receiving by the data transfer management component a data transfer request for transferring data accessible by the first data storage drive to the first computer system, in response to receiving the data transfer request:

initiating a network connection between the first and the second data storage drive, initiating an access to the requested data by the first data storage drive, initiating a transfer of the requested data from the first to the second data storage drive via the network connection, initiating a transfer of the requested data from the second data storage drive to the first computer system.

2. The method of item 1, the initiating of the access to the requested data by the first data storage drive further comprising:

initiating a mounting of a first data storage cartridge comprising the requested data into the first data storage drive.

3. The method of items 1 or 2, the requested data being provided on the first data storage cartridge in a compressed data format, the method further comprising:

controlling the first data storage drive to maintain the compressed data format by the first data storage drive, when transferring the data, initiating an decompressing of the compressed data received via the network connection by the second data storage drive before transferring the data to the first computer system.

4. The method of any of items 2 to 3, the first data storage library being connected to a third data storage library via a mechanical pass-through connection for mechanically transporting data storage cartridges from the third to the first data storage library, the third data storage library comprising the first data storage cartridge, the method further comprising:

initiating a mechanical transport of the first data storage cartridge from the third data storage library to the first data storage library via the mechanical pass-through connection.

5. The method of any of items 2 to 4, the method further comprising:

in response to the mounting of the first data storage cartridge into the first data storage drive initiating a queuing of data access commands to the first data storage drive, in response to the unmounting of the first data storage cartridge ending the respective queuing of data access commands.

6. The method of any of items 2 to 5, the initiating of the access to the requested data by the first data storage drive further comprising:

selecting a subset of one or more data files of a set of data files comprised by the first data storage cartridge to be transferred via the network connection, initiating a reading of the selected subset of data files by the first data storage drive.

7. The method of any of items 2 to 6, the first data storage library being one of a set of data storage libraries, the method further comprising in response to receiving the data transfer request:

selecting the first data storage library from the set of data storage libraries by initiating a querying of a file database comprising an inventory of the data files comprised by the data storage cartridges of the set of data storage libraries for the requested data.

8. The method of item 7, the selecting further comprising:

in case the data storage library comprising the requested data comprises a dedicated data storage drive connectable to the second data storage drive via a network connection, selecting the dedicated data storage drive to be the first data storage drive and the data storage library comprising the dedicated data storage drive to be the first data storage library.

9. The method of item 7 or 8, the selecting further comprising:

in case the data storage library comprising the requested data comprises no data storage drive connectable to the second data storage drive via a network connection, initiating a querying of a first connection database comprising an inventory of data storage drives of the set of data storage libraries connectable to the second data storage drive via a network connection and of establishment of mechanical pass-through connections between the data storage libraries of the set of data storage libraries, in response to an identification of a data storage drive connectable to the second data storage drive via a network and comprised by a library connected with the data storage library comprising the requested data via one of the established mechanical pass-through connections, selecting the identified data storage drive to be the first data storage drive and the data storage library comprising the identified data storage drive to be the first data storage library.

10. The method of item 1, the requested data being comprised by a second computer system connectable to the first data storage drive, the initiating of the access to the requested data by the first data storage drive further comprising:

initiating a transfer of the requested data from the second computer system to the first data storage drive.

11. The method of item 10, the method further comprising:

in response to the transfer of the requested data to the first data storage drive initiating a compression of the requested data into a compressed data format by the first data storage drive, initiating a decompressing of the compressed data received via the network connection by the second data storage drive before transferring the data to the first computer system.

12. The method of item 10 or 11, the first data storage library being one of a set of data storage libraries, the method further comprising in response to receiving the data transfer request:

selecting the first data storage library from the set of data storage libraries by initiating a querying of a second connection database comprising an inventory of data storage drives of the set of data storage libraries connectable to the second data storage drive via a network connection and simultaneously connectable to the second computer system, in response to an identification of a data storage drive connectable to the second data storage drive via a network connection and simultaneously connectable to the second computer system, selecting the identified data storage drive to be the first data storage drive and the data storage library of the identified data storage drive to be the first data storage library.

13. The method of any of items 10 to 12, the first data storage drive comprising at least two ports, the ports being operable in a first mode, pass-through mode, such that a first one of the ports is operated as a receiving port of the first data storage drive and a second one of the ports is operated as a sending port of the first data storage drive, in response to detecting the first data storage drive being operated in the pass-through mode the initiating of the transfer of the requested data from the second computer system to the first data storage drive further comprising:
  initiating a connection between the receiving port of the first data storage drive and the second computer system, and
the initiating of the network connection between the first and the second data storage drive further comprising:
  the network connection being initiated between the sending port of the first data storage drive and a receiving port of the second magnetic data drive.

14. The method of item 13, the ports of the first data storage drive further being operable in a second mode such that both ports are operated as receiving or sending ports, the method further comprising:
  in response to detecting the first data storage drive being operated in the second mode initiating a switching from the second mode to the pass-through mode,
  in response to transfer of the requested data to the second data storage drive initiating a switching from the pass-through mode to the second mode.

15. The method of item 13 or 14, the first data storage drive comprising more than two ports, a first set of one or more ports being connectable to the second data storage drive, a second set of one or more ports being connectable to the second computer system, the method further comprising in the pass-through mode selecting a port of the first set of ports to be operated as a receiving port of the first data storage drive and a port of the second set of ports to be simultaneously operated as a sending port of the first data storage drive.

16. The method of any of items 10 to 15, the method further comprising:
  receiving the data transfer request from the second computer system.

17. The method of any of items 1 to 16, the method further comprising:
  receiving the data transfer request from the first computer system.

18. The method of any of items 1 to 17, the second data storage drive comprising at least two ports, the ports being operable in a first mode, pass-through mode, such that a first one of the ports is operated as a receiving port of the first data storage drive and a second one of the ports is simultaneously operated as a sending port of the first data storage drive, in response to detecting the second data storage drive being operated in the pass-through mode the initiating of the network connection between the first and the second data storage drive further comprising:
  the network connection being initiated between the receiving port of the second data storage drive and a sending port of the first magnetic data drive, and
the initiating of the transfer of the requested data from the second data storage drive to the first computer system further comprising:
  controlling the second tape drive to transfer the requested data being transferred to the first computer system via the sending port.

19. The method of item 18, the at least two ports of the second data storage drive further being operable in a second mode such that both ports are operated as receiving or sending ports, the method further comprising:
  in response to detecting the second data storage drive being operated in the second mode initiating a switching from the second mode to the pass-through mode,
  in response to the transfer of the requested data to the first computer system initiating a switching from the pass-through mode to the second mode.

20. The method of item 18 or 19, the second data storage drive comprising more than two ports, a first set of one or more ports being connectable to the first data storage drive, a second set of one or more ports being connectable to the first computer system, the method further comprising in the pass-through mode selecting a port of the first set of ports to be operated as the receiving port of the second data storage drive and a port of the second set of ports to be simultaneously operated as the sending port of the second data storage drive.

21. The method of item 20, the method further comprising selecting the receiving and the sending port from the first and second set of ports based on the data transfer performance provided by the ports of the two sets.

22. The method of any of items 1 to 17, the method further comprising:
  initiating in response to receiving the data transfer request a mounting of a second data storage cartridge into the second data storage drive,
the initiating of the transfer of the requested data to the second data storage drive further comprising:
  initiating a storing the requested data onto the second data storage cartridge by the second data storage drive,
the initiating the transfer of the requested data to the first computer system comprising:
  initiating a reading of requested data to be transferred to the first computer system from the second data storage.

23. The method of item 22, the method further comprising:
  in response to the transfer of the requested data to the first computer system initiating a deletion of the requested data from the second data storage cartridge.

24. A computer program product for transferring data from a first data storage drive of a first data storage library to a first computer system, the first computer system being connectable to a second data storage drive of a second data storage library, data transfer between the first and second data storage drive being controlled by a data transfer management component, the computer program product comprising a computer readable storage medium having program instructions embodied therewith, the program instructions executable by a processor being adapted to cause the processor to control the data transfer management component to perform the method according to any of the previous items.

25. A data transfer management computer system for transferring data from a first data storage drive of a first data storage library to a first computer system, the first computer system being connectable to a second data storage drive of a second data storage library, data transfer between the first and second data storage drive via the network connection being controlled by the transfer management computer system, the transfer management computer system computer system comprising a memory for storing machine executable instructions and a processor for executing the machine executable instructions, execution of the machine executable instructions by the processor causing the processor to control the data transfer management computer system to perform the method according to any of the previous items.

What is claimed is:

1. A computer-implemented method for transferring data from a first data storage drive of a first data storage library of a plurality of data storage libraries to a target computer system, the target computer system being connectable to a second data storage drive of a second data storage library and not connectable to the first data storage drive, the method comprising: receiving by a data transfer management component a data transfer request for transferring requested data to the target computer system;
   in response to determining, by the data transfer management component, that the requested data is in the first data storage library and that the first data storage drive and the second data storage drive are connectable by a bidirectional network bridge connection:
      initiating, by the data transfer management component, a network connection between the first and the second data storage drive over the bidirectional network bridge connection;
      initiating, by the data transfer management component an access to the requested data by the first data storage drive;
   initiating, by the data transfer management component, a transfer of the requested data from the first data storage drive to the second data storage drive via the network connection; and
   initiating, by the data transfer management component, a transfer of the requested data from the second data storage drive to the target computer system;
   in response to determining, by the data transfer management component, that the requested data is not in the first data library and is in a third data storage library of the plurality of data storage libraries that is connected to the first data storage library by a mechanical pass-through connection that mechanically transports data storage cartridges from the third data storage library to the first data storage library:
      initiating, by the data transfer management component, a mechanical transport of a data storage cartridge containing the requested data from the third data storage library to the first data storage library via the mechanical pass-through connection;
      initiating, by the data transfer management component, a mounting of the data storage cartridge into the first data storage drive;
      initiating, by the data transfer management component, a network connection between the first and the second data storage drive over the bidirectional network bridge connection;
      initiating, by the data transfer management component, an access to the requested data by the first data storage drive;
      initiating, by the data transfer management component, a transfer of the requested data from the first data storage drive to the second data storage drive via the network connection; and
      initiating, by the data transfer management component, a transfer of the requested data from the second data storage drive to the target computer system.

2. The method of claim 1, wherein the requested data on the data storage cartridge is in a compressed data format, the method further comprising:
   controlling, by the data transfer management component, the first data storage drive to maintain the compressed data format by the first data storage drive when transferring the data; and
   initiating, by the data transfer management component a decompressing of the compressed data received via the network connection by the second data storage drive before transferring the data to the first computer system.

3. The method of claim 1, the method further comprising:
   in response to the mounting of the data storage cartridge into the first data storage drive, initiating, by the data transfer management component a queuing of data access commands to the first data storage drive; and
   in response to an unmounting of the first data storage cartridge, ending, by the data transfer management component the respective queuing of data access commands.

4. The method of claim 1, wherein the initiating of the access to the requested data by the first data storage drive further comprises:
   selecting, by the data transfer management component a subset of one or more data files of a set of data files comprised by the first data storage cartridge to be transferred via the network connection; and
   initiating, by the data transfer management component, a reading of the selected subset of data files by the first data storage drive.

5. The method of claim 1, wherein the requested data is comprised by a second computer system connectable to the first data storage drive, and wherein initiating the access to the requested data by the first data storage drive further comprises:
   initiating, by the data transfer management component, a transfer of the requested data from the second computer system to the first data storage drive.

6. The method of claim 5, the method further comprising:
   in response to the transfer of the requested data to the first data storage drive:
      initiating, by the data transfer management component a compression of the requested data into a compressed data format by the first data storage drive; and
      initiating, by the data transfer management component, a decompressing of the compressed data received via the network connection by the second data storage drive before transferring the data to the first computer system.

7. The method of claim 1, wherein the second data storage drive comprises at least two ports, the ports being operable in a pass-through mode, such that a first one of the ports is operated as a receiving port of the first data storage drive and a second one of the ports is simultaneously operated as a sending port of the first data storage drive the method further comprising:
   in response to detecting that the second data storage drive is operating in the pass-through mode:
   initiating the network connection between the first and the second data storage drive between the receiving port of the second data storage drive and a sending port of the first data storage data drive; and
   initiating the transfer of the requested data from the second data storage drive to the first computer system via the sending port.

* * * * *